US010986438B2

(12) United States Patent
Honji et al.

(10) Patent No.: US 10,986,438 B2
(45) Date of Patent: Apr. 20, 2021

(54) SPEAKER SYSTEM AND VEHICLE DOOR

(71) Applicant: Yamaha Corporation, Hamamatsu (JP)

(72) Inventors: Yoshikazu Honji, Hamamatsu (JP);
Koichi Morita, Hamamatsu (JP);
Yusuke Sugino, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 16/748,903

(22) Filed: Jan. 22, 2020

(65) Prior Publication Data

US 2020/0162809 A1 May 21, 2020

Related U.S. Application Data

(63) Continuation of application No. PCT/JP2018/026841, filed on Jul. 18, 2018.

(30) Foreign Application Priority Data

Jul. 28, 2017 (JP) .............................. JP2017-146997
Jul. 28, 2017 (JP) .............................. JP2017-146998

(51) Int. Cl.
*H04R 1/28* (2006.01)
*B60J 5/04* (2006.01)
(Continued)

(52) U.S. Cl.
CPC .......... *H04R 1/2811* (2013.01); *B60J 5/0463* (2013.01); *B60R 11/00* (2013.01);
(Continued)

(58) Field of Classification Search
CPC .. H04R 1/2811; H04R 1/025; H04R 2499/13; B60J 5/0463; B60R 11/00; B60R 11/0217; B60R 2011/0021; B60R 2011/0043

See application file for complete search history.

(56) References Cited

U.S. PATENT DOCUMENTS

2004/0120541 A1  6/2004 Maekawa et al.
2005/0013459 A1* 1/2005 Maekawa ........... B60R 11/0217
                                                381/349
(Continued)

FOREIGN PATENT DOCUMENTS

JP             6-3746 U    1/1994
JP         10-108290   *   4/1998   ............... H04R 1/28
(Continued)

OTHER PUBLICATIONS

Engish translation of JP10-108290; Apr. 1998.*
(Continued)

*Primary Examiner* — Andrew L Sniezek
(74) *Attorney, Agent, or Firm* — Crowell & Moring LLP

(57) ABSTRACT

A speaker system includes an outer panel of a vehicle door of a vehicle having a compartment; a panel member that constitutes a part of the vehicle door, the panel member being closer to the compartment than is the outer panel; an inner panel of the vehicle door, the inner panel residing between the outer panel and the panel member to form a first space and a second space, the first space being defined between the panel member and the inner panel, and the second space being defined between the outer panel and the inner panel, wherein the inner panel has a through hole that communicates the first space with the second space; and a speaker mounted to the panel member; wherein: the panel member is mounted to the inner panel; and the panel member together with at least the outer panel constitutes an enclosure for the speaker.

9 Claims, 24 Drawing Sheets

(51) Int. Cl.
  *B60R 11/00* (2006.01)
  *B60R 11/02* (2006.01)
  *H04R 1/02* (2006.01)
(52) U.S. Cl.
  CPC .......... *B60R 11/0217* (2013.01); *H04R 1/025* (2013.01); *B60R 2011/0021* (2013.01); *B60R 2011/0043* (2013.01); *H04R 2499/13* (2013.01)

(56) References Cited

U.S. PATENT DOCUMENTS

| 2006/0049664 | A1* | 3/2006 | Koa | B60J 5/0416 |
| | | | | 296/152 |
| 2007/0222249 | A1* | 9/2007 | Valentage | B60R 13/0243 |
| | | | | 296/39.1 |
| 2014/0241547 | A1* | 8/2014 | Sulowski | H04R 1/025 |
| | | | | 381/86 |

FOREIGN PATENT DOCUMENTS

| JP | 2003-348678 A | 12/2003 |
| JP | 2004-166064 A | 6/2004 |
| JP | 2005-39454 A | 2/2005 |
| JP | 2005-80103 A | 3/2005 |
| JP | 2009-137416 A | 6/2009 |
| JP | 4989763 B2 | 8/2012 |

OTHER PUBLICATIONS

Japanese-language Office Action issued in Japanese Application No. 2017-146997 dated Apr. 14, 2020 with English translation (eight pages).

Japanese-language Office Action issued in Japanese Application No. 2017-146998 dated Apr. 14, 2020 with English translation (eight pages).

International Search Report (PCT/ISA/210) issued in PCT Application No. PCT/JP2018/026841 dated Oct. 9, 2018 with English translation (five (5) pages).

Japanese-language Written Opinion (PCT/ISA/237) issued in PCT Application No. PCT/JP2018/026841 dated Oct. 9, 2018 (five (5) pages).

English translation of Chinese Office Action issued in Chinese Application No. 201880045687.7 dated Jul. 31, 2020 (nine (9) pages).

Japanese-language Office Action issued in Japanese Application No. 2017-146998 dated Dec. 1, 2020 with English translation (8 pages).

* cited by examiner

SPEAKER SYSTEM AND VEHICLE DOOR

CROSS REFERENCE TO RELATED APPLICATIONS

This application is a Continuation Application of PCT Application No. PCT/JP2018/026841, filed Jul. 18, 2018, and is based on and claims priority from Japanese Patent Application No. 2017-146997, filed on Jul. 28, 2017, and Japanese Patent Application No. 2017-146998, filed on Jul. 28, 2017, the entire contents of each of which are incorporated herein by reference.

BACKGROUND

Technical Field

The present disclosure relates to a speaker system and to a vehicle door in which the speaker system is housed.

Background Information

As described in Japanese Patent No. 4989763, for example, a vehicle door includes an outer panel, a door trim, and an inner panel arranged between the outer panel and the door trim. In the inner panel, a maintenance through-hole is formed. Using the through-hole a worker is able to access a space surrounded by the outer panel and the inner panel following assembly of the vehicle door. Japanese Patent No. 4989763 discloses a speaker system used in such a vehicle door. A speaker of a speaker system is mounted to the inner panel. The inner panel and the outer panel constitute a part of an enclosure that acts as a cabinet for housing the mounted speaker. The enclosure is defined by a space between the outer panel and the inner panel of the door 1. To improve sound quality, the through-hole is covered by a soundproof member.

Generally, a lowest resonance frequency of a speaker system is determined by an area volume of a cabinet in which a speaker is housed. The lowest resonance frequency tends to increase with a decrease in the area volume of the cabinet. As the lowest resonance frequency increases, a sound pressure across a low sound range decreases. In the conventional speaker system described in Japanese Patent No. 4989763, the area volume of the cabinet is limited to that defined by the space between the outer panel and the inner panel. The limited area volume of the cabinet gives rise to a drawback in that a sound pressure across the low sound range is limited, which results in a poor sound quality

SUMMARY

The present disclosure has been made in view of the above-described circumstances. An object of the present disclosure is to provide a speaker system capable of increasing a sound pressure across a low sound range, and a vehicle door for housing the speaker system.

A speaker system according to an aspect of the present disclosure includes an outer panel that constitutes a first part of a vehicle door of a vehicle having a compartment; a panel member that constitutes a second part of the vehicle door, the panel member being situated closer to the compartment than the outer panel; an inner panel that constitutes a third part of the vehicle door, the inner panel residing between the outer panel and the panel member to form a first space and a second space, the first space constituting a space defined between the panel member and the inner panel, and the second space constituting a space defined between the outer panel and the inner panel, wherein the inner panel has a through hole configured to communicate the first space with the second space; and a speaker mounted to the panel member; wherein: the panel member is mounted to the inner panel; and the panel member together with at least the outer panel constitutes a speaker enclosure.

A vehicle door of a vehicle having a compartment according to an aspect of this disclosure includes an outer panel; a panel member situated closer to the compartment than the outer panel; an inner panel residing between the outer panel and the panel member to form a first space and a second space, the first space constituting defined between the panel member and the inner panel, and the second space constituting a space defined between the outer panel and the inner panel, wherein the inner panel has a through-hole configured to communicate the first space with the second space; and a speaker mounted to the panel member; wherein: the panel member is mounted to the inner panel; and the panel member together with at least the outer panel forms a speaker enclosure.

DESCRIPTION OF THE EMBODIMENTS

1. First Embodiment

Figure 1:
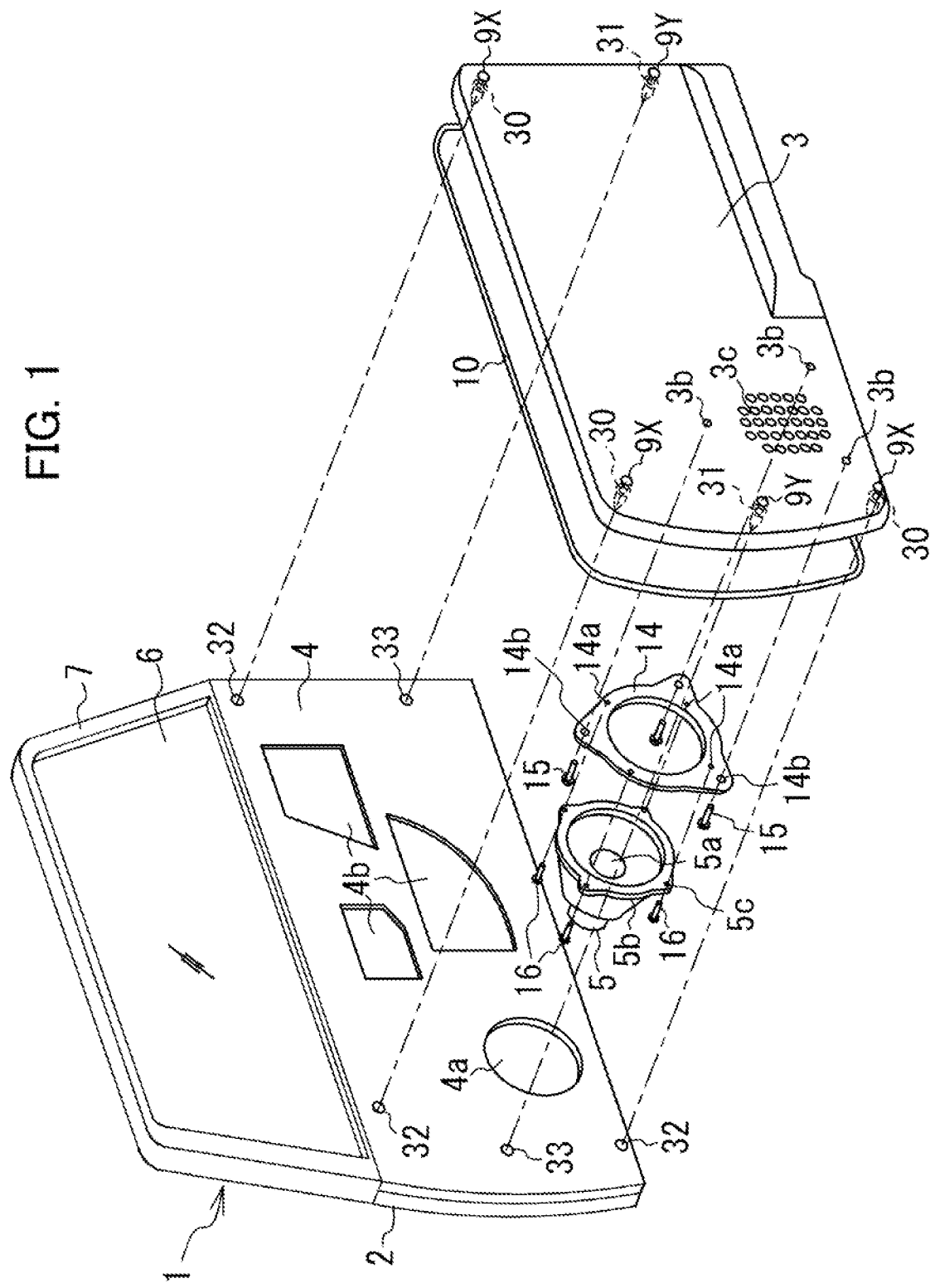
FIG. 1 is an exploded perspective view showing a vehicle door including a speaker system according to a first embodiment.

Hereafter, a first embodiment of the present disclosure will be described with reference to the figures. FIG. 1 is an exploded perspective view showing configurations of a speaker system and a vehicle door according to the first embodiment. A vehicle door 1 includes a compartment. As shown in the figure, the vehicle door 1 includes a first panel 2, a second panel 3, a third panel 4, and a speaker 5. The first panel 2 is referred to as an outer panel. The first panel 2 (the outer panel) is a part of the vehicle door 1. The second panel 3 is an interior part of the vehicle door 1. The second panel 3 is situated closer to the compartment than the first panel 2.

The second panel 3 is also referred to as a door trim. The second panel 3 (the door trim) is an example of a panel member. The third panel 4 is a part of the vehicle door 1. The third panel 4 is arranged between the first panel 2 and the second panel 3 to form spaces 11 and 12 (see FIG. 2). The space 11 is defined by the second panel 3 and the third panel 4. The space 12 is defined by the third panel 4 and the first panel 2. The third panel 4 is situated closer to the compartment than the first panel 2. The third panel 4 is also referred to as an inner panel. In the third panel 4 (the inner panel), through-holes 4b are formed. At least one of the through-holes 4b is configured to communicate the space 11 with the space 12. Instead of through-holes 4b, a single through-hole 4b may be formed in the third panel 4. The speaker 5 has a sound-output surface 5a that outputs sound toward the compartment. The speaker 5 is mounted to the second panel 3. After the speaker 5 is mounted to the second panel 3, the second panel 3 is mounted to the third panel 4. The second panel 3 is situated closer to the compartment than the third panel 4. In a configuration that the second panel 3, to which the speaker 5 is mounted, is mounted to the third panel 4, the second panel 3 together with at least the first panel 2 constitute a speaker enclosure, that is, an enclosure (a cabinet) for the speaker 5. Generally, the first panel 2 and the third panel 4 are formed from steel plate. The first panel 2 includes an outer edge portion.

The outer edge portion of the first panel 2 is coupled to the third panel 4. The first panel 2 and the third panel 4 may be formed either from an aluminum alloy or a carbon material. Generally, the second panel 3 is formed from a synthetic resin-molded plate. It is of note that in the present disclosure, materials used to form the panels 2, 3, and 4 are not limited to those stated. To the first panel 2 and the third panel 4, a frame body 7 is mounted. The frame body 7 houses a window glass 6 that is vertically movable.

In the third panel 4, a through-hole 4a and the through-holes 4b are formed. The speaker 5 is inserted into the through-hole 4a. The through-holes 4b are used to accommodate a door lock actuator (not shown) and a motor for vertical movement of the window glass 6. In the embodiment, at least one of the through-holes 4b is not used to accommodate any the motor, the door lock actuator (not shown), or a dedicated member covering one of the through-holes 4b.

Figure 2:
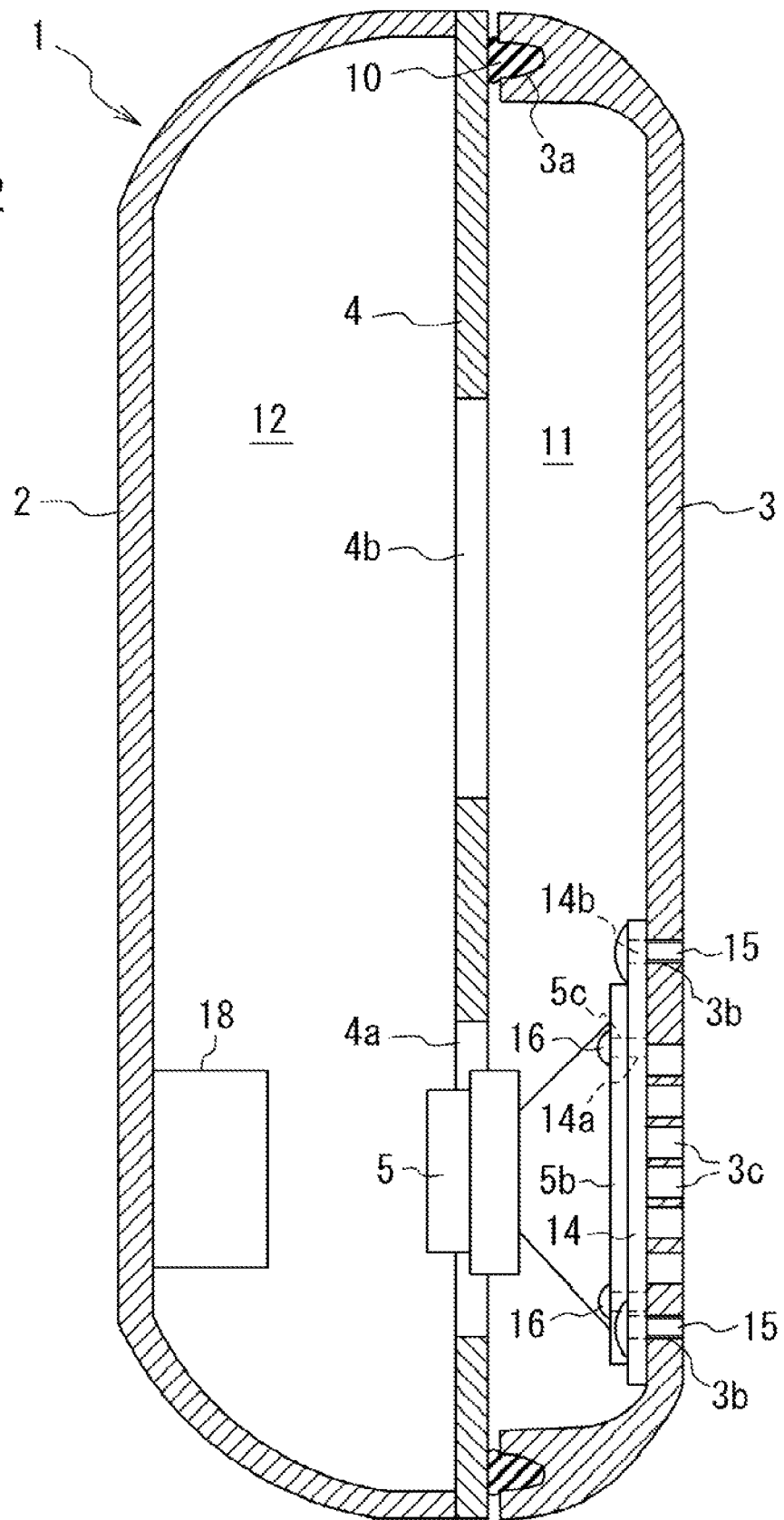
FIG. 2 is a longitudinal sectional view of the speaker system.

The second panel 3 is mounted to the third panel 4. The second panel 3 includes an outer edge portion. The outer edge portion of the second panel 3 is detachably fitted to the third panel 4 by coupling members 9X and 9Y (refer to FIGS. 10 and 11). Each of the coupling members 9X and 9Y includes a male member 9a and a female member 9b. As shown in FIG. 2, the vehicle door 1 further includes a packing 10. A groove 3a is formed on the outer edge portion of the second panel 3. The groove 3a is an example of a part to which the packing 10 is mounted. The packing 10 is fitted into the groove 3a, and acts to increase an airtightness of the space 11 between the second panel 3 and the third panel 4. The space 11 is communicated with the space 12 between the first panel 2 and the third panel 4. Specifically, at least one of the uncovered through-holes 4b is used to communicate the space 11 between the second panel 3 and the third panel 4 with the space 12 between the first panel 2 and the third panel 4.

The speaker 5 is mounted to the second panel 3 via a mounting member 14. The second panel 3 has screw holes 3b. The mounting member 14 has an annular shape, and is provided with screw holes 14a and screw holes 14b. The screw holes 14a are used to mount the speaker 5 to the mounting member 14 with screws 16, and the screw holes 14b are used to mount the mounting member 14 to the second panel 3 with screws 15. The speaker 5 has a flange 5b. The flange 5b has holes 5c. By screwing respective ones of the screws 16 through respective ones of the screw holes 14a via respective ones of the holes 5c, the mounting member 14 is fixed to the speaker 5. And by screwing respective ones of the screws 15 through respective ones of the screw holes 3b via respective ones of the holes 14b, the speaker 5 and the mounting member 14 are fixed to the second panel 3. The second panel 3 includes a region for mounting the speaker 5. Holes 3c are formed in the region where the speaker 5 is mounted. Each of the holes 3c is used to output sound, which is outputted from the speaker 5, into the compartment. The speaker 5 includes a back surface. The first panel 2 includes a facing surface that faces the back surface of the speaker 5. A sound absorbing member 18 is mounted to the facing surface of the first panel 2. The sound absorbing member 18 inhibits occurrence of standing waves.

According to the speaker system shown in FIGS. 1 and 2, the space 12, which is formed between the first panel 2 and the third panel 4, is communicated with the space 11, which is defined between the second panel 3 and the third panel 4, through the through-holes 4b. Thus the enclosure space for housing the speaker 5, specifically the space in the enclosure defined by at least the second panel 3 and the first panel 2, includes each of the spaces 11 and 12. Therefore, compared to the conventional speaker system in which the space in the enclosure consists of only the space 12, an area volume of the enclosure (cabinet) for the speaker 5 can be increased. Thus, a lowest resonance frequency can be lowered, and consequently a sound pressure across a low sound range can be increased.

In a construction in which the speaker 5 is mounted to the third panel 4, which is coupled to the first panel 2 in advance, a member is required that inhibits sound from the speaker 5 from entering a space between the speaker 5 and the second panel 3. However, in the embodiment, the speaker 5 is mounted to the second panel 3, and thus there is no need to provide a sound-inhibiting member. Further, an advantage is obtained in that assembly of the speaker system can be achieved by simply mounting the second panel 3 to the third panel 4.

The through-holes 4b in the third panel 4 may be covered with a synthetic resin film or the like that causes minimal transmission loss in the low sound range. Thus, even when each of the through-holes 4b is covered by the film, for practical purposes the space defined between the first panel 2 and the second panel 3 can be regarded as an integral space (enclosure space) particularly in the low sound range.

When at least one of the aspects described in the following examples is applied to the present disclosure described above, sound quality can be further improved. In the example illustrated in FIGS. 3 and 4, the second panel 3 includes a mounting portion 3d and a portion 3e. The speaker 5 is mounted to the mounting portion 3d. The mounting portion 3d is an example of a first portion. The speaker 5 is not mounted to the portion 3e. The portion 3e is an example of a second portion. The thickness W1 of the mounting portion 3d is greater than the thickness W2 of the portion 3e. As stated above, when the mounting portion 3d is thicker than the portion 3e, a mass of the mounting portion 3d increases, and a rigidity of the mounting portion 3d increases. Thus, when the speaker 5 vibrates substantially, vibration of the second panel 3 can be restrained. In this way, it is possible to minimize enclosure noise caused by substantial vibration of the speaker 5. Thus, sound quality is improved.

Figure 3:
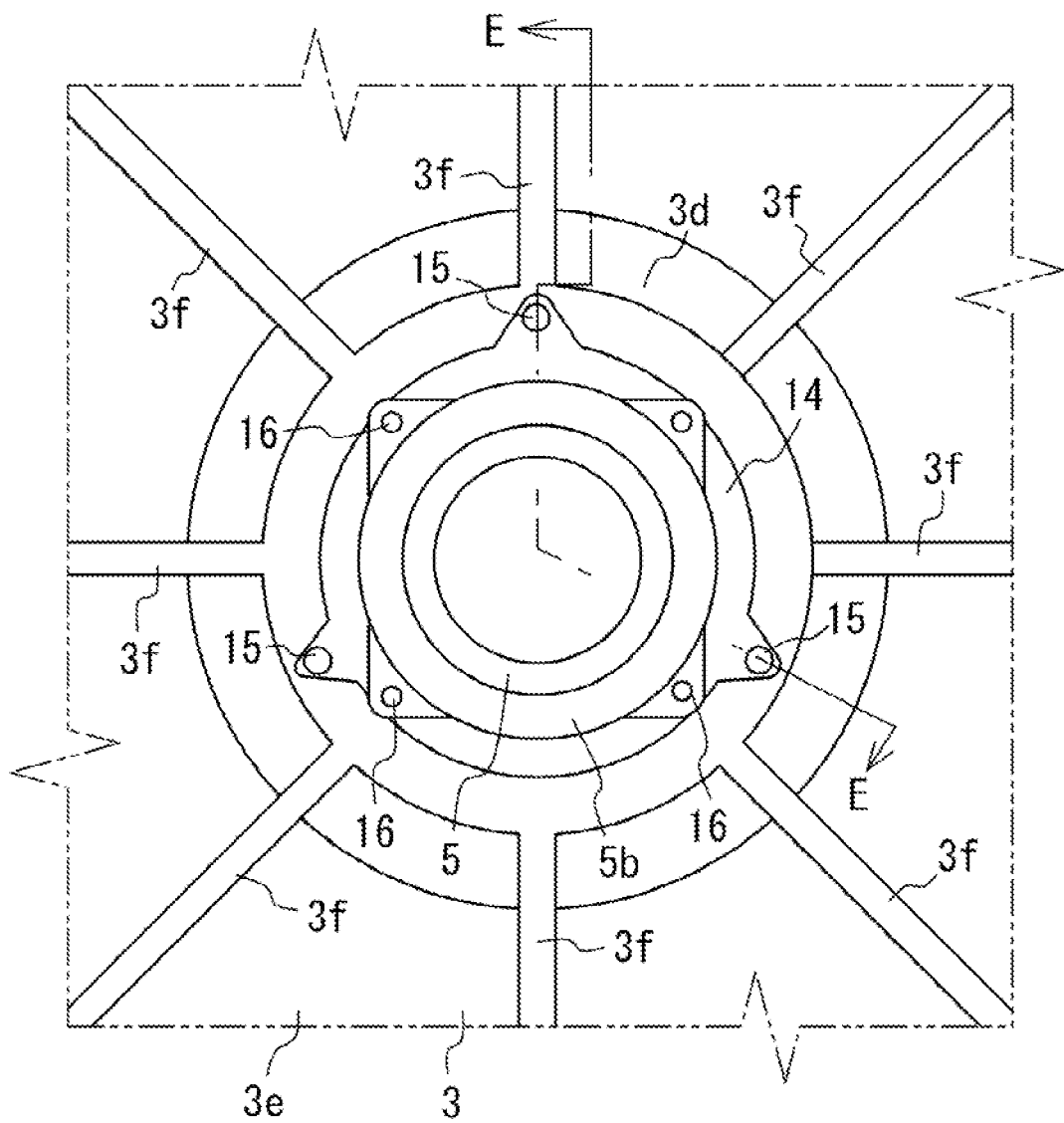
FIG. 3 is a view of another example of a mounting structure of a speaker unit of the speaker system as viewed from the exterior.
Figure 4:
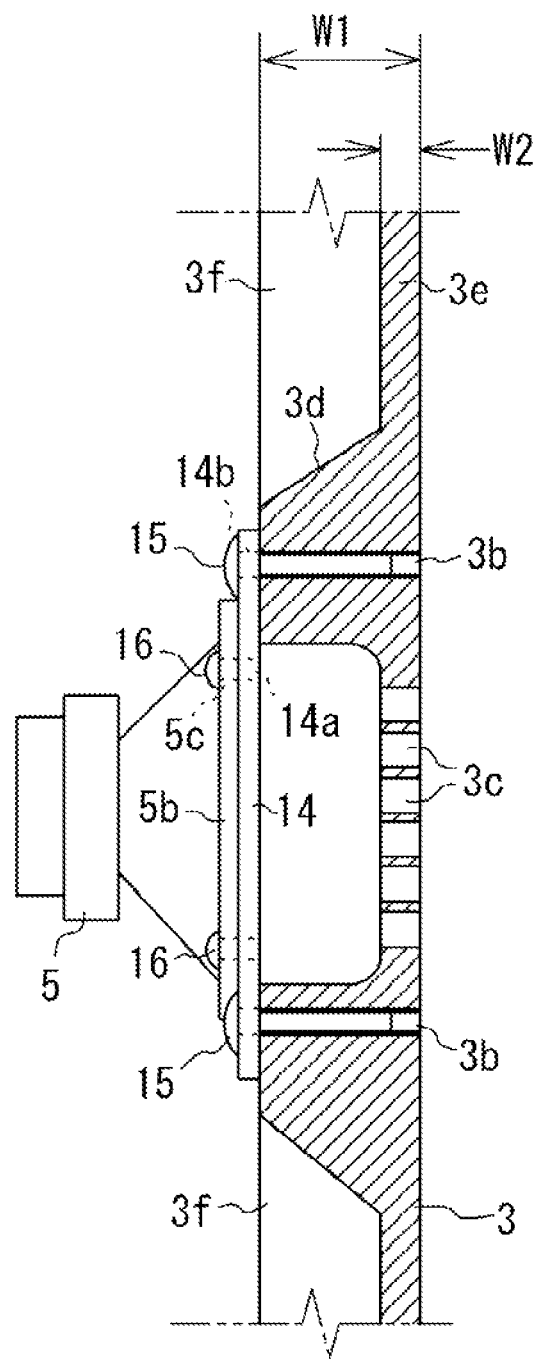
FIG. 4 is a cross-sectional view taken along line E-E of FIG. 3.

In the example illustrated in FIGS. 3 and 4, the second panel 3 includes ribs 3f. Each of the ribs 3f is integrally formed with the mounting portion 3d, and spaced apart radially around the mounting portion 3d. By this construction, rigidity of the second panel 3 is further increased, and vibration of the second panel 3 more effectively restrained. Thus, sound quality is further improved. To make the mounting portion 3d thicker, a wood, synthetic resin, or a metal ring may be adhered to the second panel 3 with an adhesive.

Figure 5:
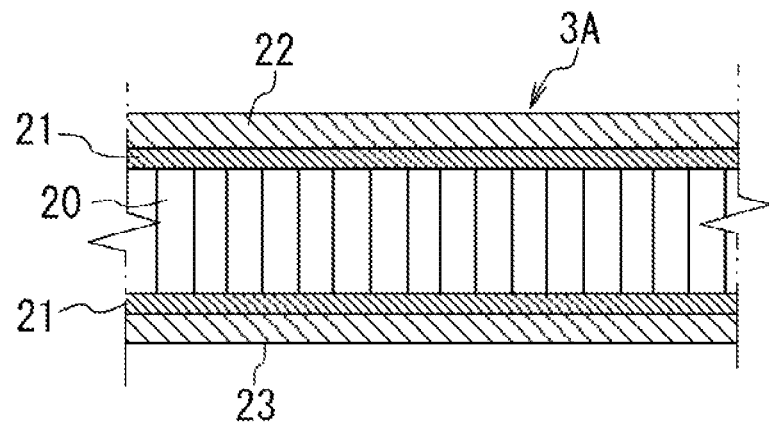
FIG. 5 is a cross-sectional view showing an example of a second panel (a door trim) comprising the speaker system.
Figure 6:
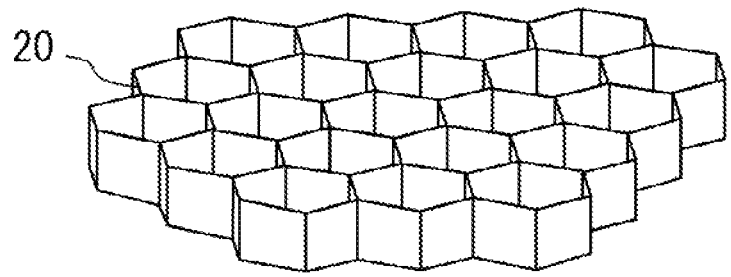
FIG. 6 is a perspective view showing a honeycomb structure used in the second panel of FIG. 5.

FIG. 5 shows an example of another second panel 3A that can be used for vibration restraint. The second panel 3A includes a plate-shaped core material 20 (an internal member), adhesives 21, a surface material 22 and a back-surface material 23. The surface material 22 and the back-surface material 23 are each formed of a synthetic resin or the like. The core material 20 has a honeycomb structure as shown in FIG. 6. The core material 20 includes a first surface and a second surface opposing the first surface. The surface material 22 is adhered to the first surface of the core material 20 by use of one of the adhesives 21. The back-surface material 23 is adhered to the second surface of the core material 20 by use of another of the adhesives 21.

As described above, use of a honeycomb structure for the plate-shaped core material 20 imparts properties of low weight and high rigidity to the second panel 3A. Further, use of the honeycomb structure causes an increase in the transmission loss in the low sound range. Consequently passage of sound output from the back surface of the speaker 5 through the second panel 3A is decreased, and sound quality is improved. In the configuration shown in FIG. 5, when the adhesives 21 are rubber adhesives with elastic properties, their use helps to absorb the vibration. Accordingly, vibration restraint can be further enhanced.

Figure 7:
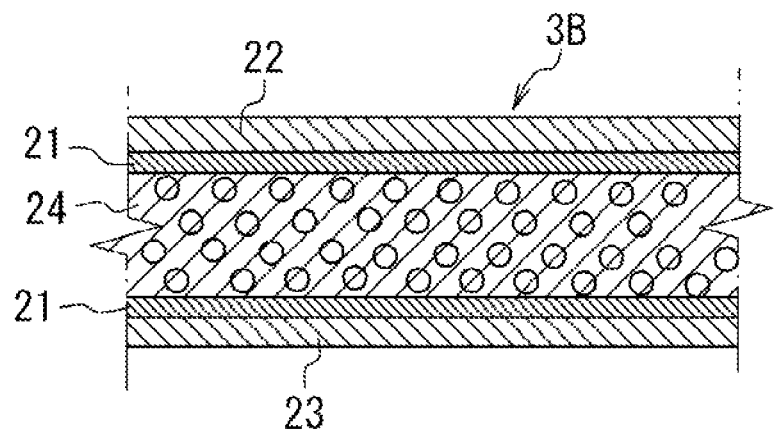
FIG. 7 is a cross-sectional view showing another example of the second panel comprising the speaker system.

FIG. 7 shows an example of another second panel 3B use of which restrains vibration. In the second panel 3B, a core material 24 is used instead of the core material 20. The core material 24 has a foam structure formed, for example, from a synthetic resin. The core material 24 includes a front surface and a back surface opposing the front surface. The surface material 22, which is formed from a synthetic resin or the like, is adhered to the front surface of the core material 24 by use of one of the adhesives 21. The back-surface material 23, which is formed from a synthetic resin or the like, is adhered to the back surface of the core material 24 by use of another of the adhesives 21.

In a construction in which the core material 24 has a foam structure, a part of energy of the vibration is expended on expansion and contraction of bubbles in the core material 24. As a result, there is an increase in transmission loss in the low sound range. Consequently passage of sound output from the back surface of the speaker 5 through the second panel 3A is decreased, and sound quality is improved. Formation of the core material 24 with independent bubbles separated by partition walls, enhances rigidity of the material.

In addition to the above-described example, when the mounting portion of the second panel 3 is formed of a material that effectively restrains vibration, such as a member having high elasticity, vibration of the second panel 3 is also restrained. By adoption of such a material in conjunction with the above-described configuration of the mounting portion 3d that is formed to have an increased thickness coupled to the ribs 3f, or the like, further enhancement of vibration restraint can be attained. The panel to which the speaker 5 is mounted, for example the second panel 3, includes a front surface and a back surface. The front surface of the second panel 3 is positioned on a compartment side (a surface material 22 side) of the second panel 3. The back surface of the second panel 3 is provided on a side (a back-surface material 23 side) opposing the compartment side of the second panel 3. It is possible to further increase the rigidity of the second panel 3, and improve sound quality by providing the ribs 3*f* on one or other of the front surface or the back surface of the second panel 3, or by providing the ribs 3*f* on both the front surface and the back surface of the second panel 3, and forming the panel with the core material 20 having a honeycomb structure or the core material 24 having a foam structure.

Figure 8:
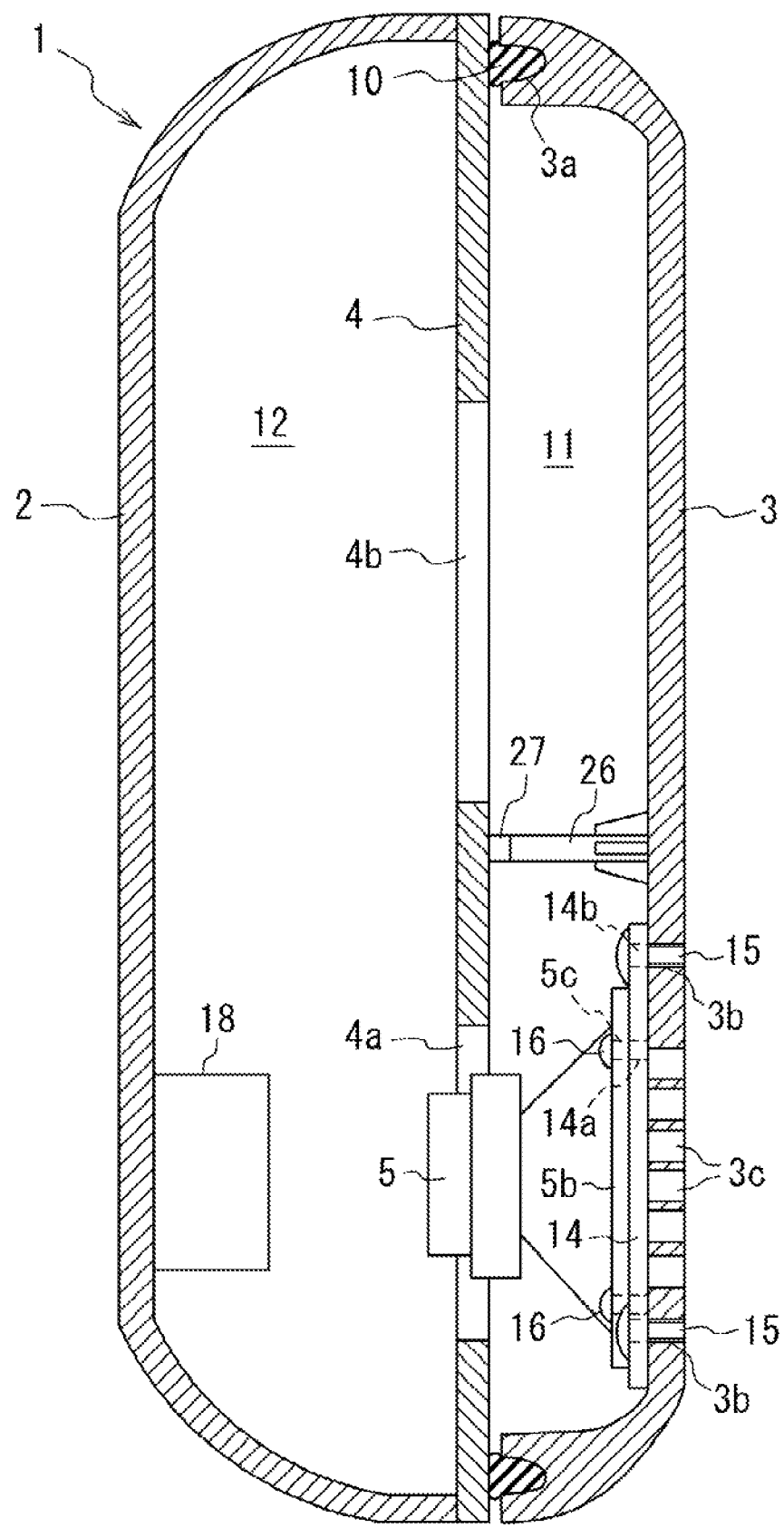
FIG. 8 is a longitudinal sectional view showing an example of a reinforcing structure of the second panel of the speaker system.

FIG. 8 shows another example configuration of the speaker system that is used to restrain vibration of the second panel 3. In the example configuration, a support column 26 is provided between the second panel 3 and the third panel 4. The support column 26 presses the second panel 3 toward the compartment. The support column 26 is configured to support the second panel 3 and the third panel 4. The support column 26 and the second panel 3 are unitarily formed. The support column 26 includes a tip end. A packing 27 is mounted at the tip end of the support column 26. The packing 27 is formed of a material having elastic properties such as rubber. The packing 27 is in contact with the third panel 4. The packing 27 and the support column 26 also may be unitarily formed.

When a thus-configured support column 26 is used to support the second panel 3, vibration of the second panel 3, which panel faces the compartment, is restrained. As a result, enclosure noise is restrained, and sound quality is improved. Further, since vibration of the second panel 3 is restrained, a need to increase a thickness of the second panel 3 or provide reinforcement ribs can be obviated.

In the configuration shown in FIG. 8, the packing 27 has elastic properties, elastic properties, and its use absorbs in part a supporting force acting on the second panel 3 and restrains vibration of the panel. The support column 26 and the second panel 3 need not be unitarily formed. The support column 26 and the third panel 4 may be unitarily formed. However, when the second panel 3 is formed of a synthetic resin and the first panel 2 is formed of a steel plate, the support column 26 and the second panel 3 can be unitarily formed with ease by integral molding. Accordingly, unitary formation of the support column 26 with the second panel 3 is advantageous for manufacture. Further, it is advantageous to provide the support column 26 as close to a center of the second panel 3 as possible to maximize vibration restraint. Furthermore, it is advantageous to provide the support column 26 on a flat plate portion of the second panel 3 also to maximize vibration restraint. In addition, more than one support column 26 may be used.

Figure 9:
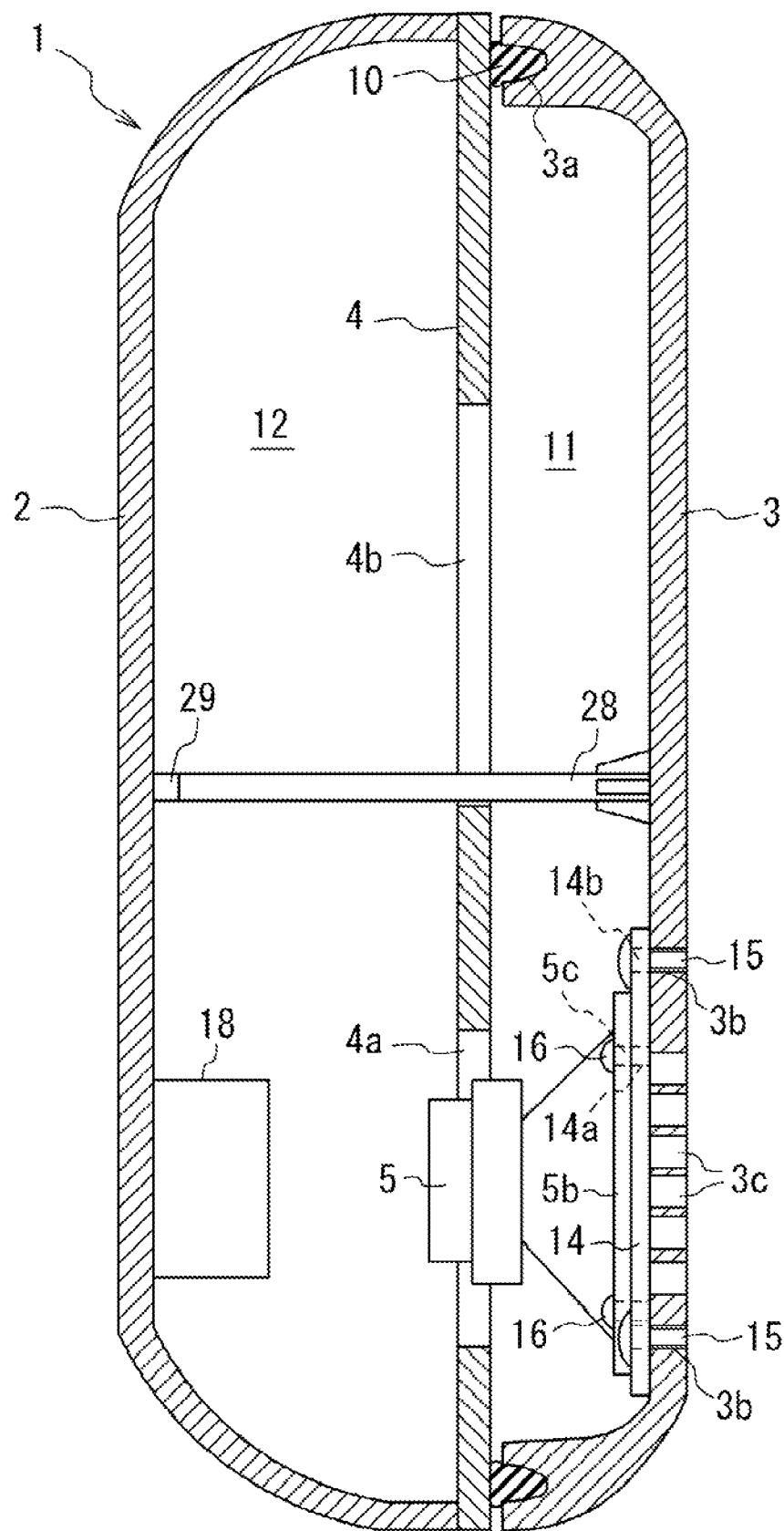
FIG. 9 is a longitudinal sectional view showing another example of the reinforcing structure of the second panel of the speaker system.

FIG. 9 shows another example configuration of the speaker system for restraining vibration of the second panel 3. In the example configuration, a support column 28 is arranged between the second panel 3 and the first panel 2. The support column 28 presses the second panel 3 toward the compartment. The support column 28 is configured to support the second panel 3 and the first panel 2. The support column 28 and the second panel 3 are unitarily formed. The support column 28 passes through one of the through-holes 4*b*. The support column 28 includes a tip end. A packing 29 is mounted to the tip end of the support column 28. The packing 29 is formed of a material having elastic properties such as rubber. The packing 29 is in contact with the first panel 2.

When a thus-configured support column 28 is used to support the second panel 3, vibration of the second panel 3, which panel faces the compartment, is restrained. As a result, enclosure noise is restrained, and the sound quality improved.

Further, since the packing 29 has elastic properties, its use absorbs in part a supporting force acting on the second panel 3 and restrains vibration of the panel. The support column 28 and the second panel 3 need not be unitarily formed. The support column 28 and the first panel 2 may be unitarily formed. However, when the second panel 3 is formed of a resin and the first panel 2 is formed of a steel plate, the support column 28 and the second panel 3 can be unitarily formed with ease by integral molding. Such, unitary formation of the support column 28 with the second panel 3 is advantageous for manufacture. Further, it is advantageous to provide the support column 28 as close to the center of the second panel 3 as possible to maximize vibration restraint. In addition, more than one support column 28 may be used.

In the example of FIG. 8, the packing 27 is mounted at the tip end of the support column 26. However, the packing 27 need not be mounted, and the tip end of the support column 26 may be in contact with the third panel 4 while directly pressing against the third panel 4. Also, in the example shown in FIG. 9, the packing 29 may not be mounted to the tip end of the support column 28, and the tip end of the support column 28 may be in direct contact with the first panel 2.

Figure 10:
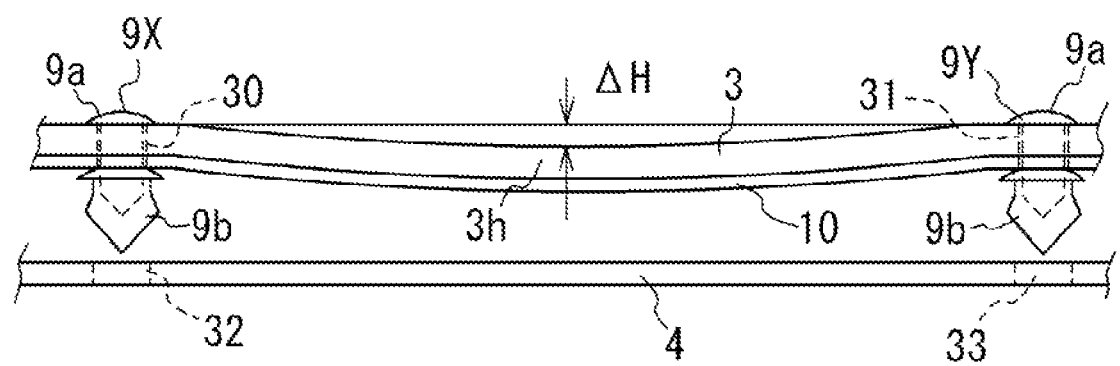
FIG. 10 is a side view showing an example of a coupling structure provided between the second panel and a third panel (an inner panel) comprising the speaker system in a state before coupling.
Figure 11:
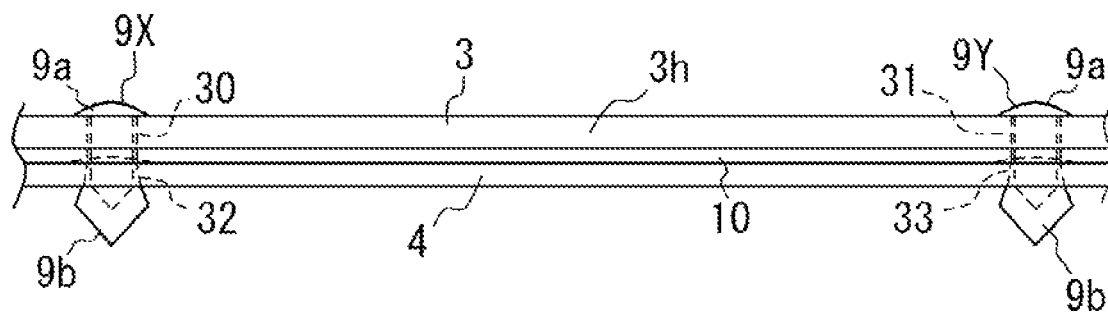
FIG. 11 is a side view showing the coupling structure provided between the second panel and the third panel of FIG. 10 in a state after coupling.

FIGS. 10 and 11 show another example configuration for enhancing the airtightness between the second panel 3 and the third panel 4. FIG. 10 shows the second panel 3 and the third panel 4 before they are coupled with each other, and FIG. 11 shows the second panel 3 and the third panel 4 after they are coupled with each other. As shown in FIGS. 10 and 11, a first hole 30 and a second hole 31 are formed in the outer edge portion of the second panel 3. The first hole 30 is spaced apart from the second hole 31. A first hole 32 and a second hole 33 are formed in the third panel 4. The first hole 32 corresponds to the first hole 30. The second hole 33 corresponds to the second hole 31.

A coupling member, which couples the second panel 3 to the third panel 4, includes the first coupling member 9X and the second coupling member 9Y. The first coupling member 9X is inserted into the first hole 30. The second coupling member 9Y is inserted into the second hole 31. Each of the coupling members 9X and 9Y consist of a known member, and include the female members 9*b* into which respective ones of the male members 9*a* are fitted. For example, when one of the male members 9*a* is tightened or loosened by screwing or unscrewing, the one of the male members 9*a* is fixed to or separated from one of the female members 9*b*.

Each of the male members 9*a* includes a flange portion. In the first coupling member 9X, as shown in FIG. 11, one of the male members 9*a* is inserted into the first hole 30 of the second panel 3 until the flange portion of the one of the male members 9*a* contacts the second panel 3. The one of the male members 9*a* is fitted into one of the females 9*b* through the first hole 30. The one of the female members 9*b* is fitted into the first hole 32 of the third panel 4. In the second coupling member 9Y, one of the male members 9*a* is inserted into the second hole 31 of the second panel 3 until the flange portion of the one of the male members 9*a* contacts the second panel 3. The one of the male members 9*a* is fitted into one of the female members 9*b* through the second hole 31. The one of the female members 9b is fitted into the second hole 33 of the third panel 4. Thereby, the second panel 3 is fixed to the third panel 4.

The outer edge portion of the second panel 3 includes a portion 3h between the first hole 30 and the second hole 31. The portion 3h has elastic properties. As shown in FIG. 10, when the second panel 3 is separated from the third panel 4, the portion 3h is bent by ΔH in a direction toward the third panel 4. Consequently, as shown in FIG. 11, when the second panel 3 is coupled to the third panel 4 by the coupling members 9X and 9Y, the portion 3h is pressed against the third panel 4 via the packing 10. As a result, adhesion and thus airtightness are increased between the second panel 3 and the third panel 4. Consequently, it is possible to increase airtightness of the enclosure and inhibit sound leakage through the gap between the second panel 3 and the third panel 4, as defined by the spaces 11 and 12. Accordingly, sound quality is improved and undesirable variations in the sound quality are eliminated.

Each of the coupling members 9X and 9Y may consist of a member comprising one or more known structures commonly used for coupling. A structure for the coupling members is not limited to that shown in FIGS. 10 and 11.

Figure 12:
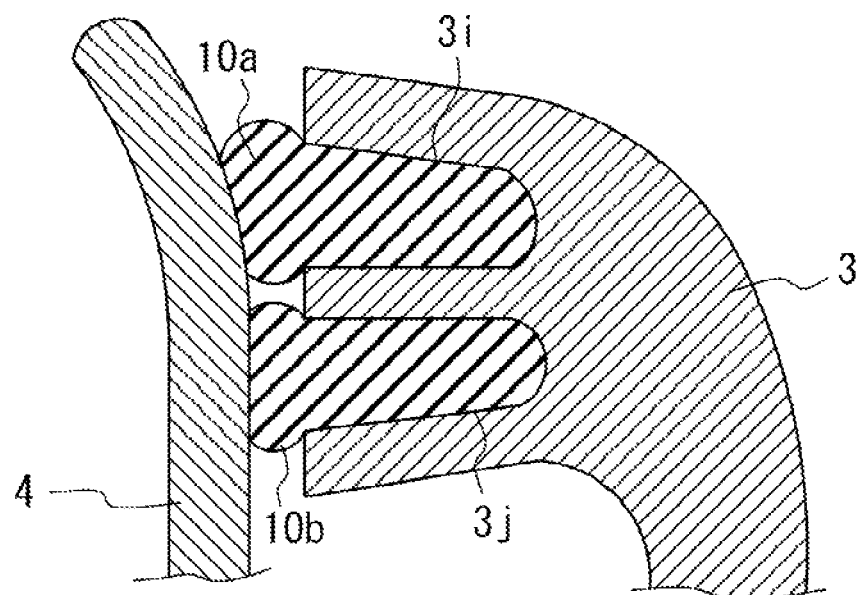
FIG. 12 is a cross-sectional view showing a combined structure of outer edge portions of the second panel and the third panel of the speaker system.

FIG. 12 shows another example configuration for enhancing airtightness between the second panel 3 and the third panel 4. In this example, the second panel 3 includes a first packing mounting portion 3i and a second packing mounting portion 3j. The first packing mounting portion 3i is formed along the outer edge portion of the second panel 3. The second packing mounting portion 3j is formed along the first packing mounting portion 3i. The packing mounting portions 3i and 3j each have a groove shape. A packing 10a is mounted to the first packing mounting portion 3i. A packing 10b is mounted to the second packing mounting portion 3j. Each of the packings 10a and 10b is formed of rubber or a similar material. The third panel 4 includes a facing surface that faces the second panel 3. The packings 10a and 10b are in contact with the facing surface of the third panel 4 while pressing against the facing surface. The packing 10a is an example of a first packing, while the packing 10b is an example of a second packing.

In the configuration shown in FIG. 12, the packing 10a is mounted to the first packing mounting portion 3i, and the packing 10b is mounted to the second packing mounting portion 3j. Thus, airtightness between the second panel 3 and the third panel 4 is increased, and sound leakage through the gap between the second panel 3 and the third panel 4 is inhibited. Thus, the second panel 3 can effectively serve as a part of the enclosure. Accordingly, sound quality is improved, and undesirable variations in the sound quality are minimized.

Figure 13:
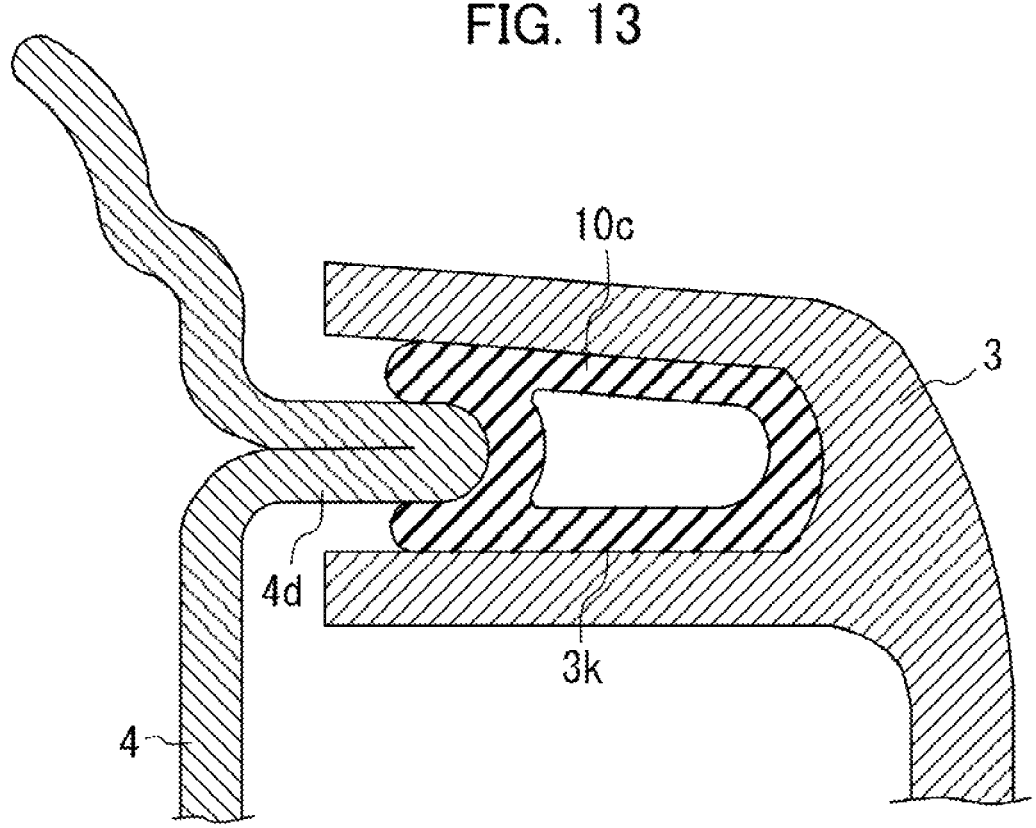
FIG. 13 is a cross-sectional view showing another example of the combined structure of the outer edge portions of the second panel and the third panel of the speaker system.

FIG. 13 shows still another example configuration for enhancing airtightness between the second panel 3 and the third panel 4. The example configuration includes a groove-shaped packing mounting portion 3k, a packing 10c, and a protuberance 4d. The packing mounting portion 3k is provided along the outer edge portion of the second panel 3. The packing 10c is formed of rubber or a similar material. The packing 10c is embedded in the packing mounting portion 3k. The third panel 4 includes an outer edge portion. The protuberance 4d is provided along the outer edge portion of the third panel 4, and is coupled to the packing mounting portion 3k via the packing 10c.

In the configuration shown in FIG. 13, the protuberance 4d is in contact with and presses against the packing 10c for coupling to the second panel 3. Consequently, adhesion between the outer edge portion of the second panel 3 and the outer edge portion of the third panel 4 is enhanced. As a result, airtightness of the space between the second panel 3 and the third panel 4 is increased, and sound leakage through the gap between the second panel 3 and the third panel 4 is inhibited. Thus, the second panel 3 can effectively serve as a sealing member for the enclosure. Accordingly, sound quality is improved, and undesirable variations in the sound quality are minimized.

The packing mounting portion 3i, 3j or 3k may be formed to have a shape other than a groove shape. For example, the packing mounting portion 3i, 3j or 3k may have a planar shape. The packing 10a, 10b, or 10c may be fixed to the packing mounting portion by welding, bonding, a fixture mechanism, or by other known ways of fixing.

Figure 14:
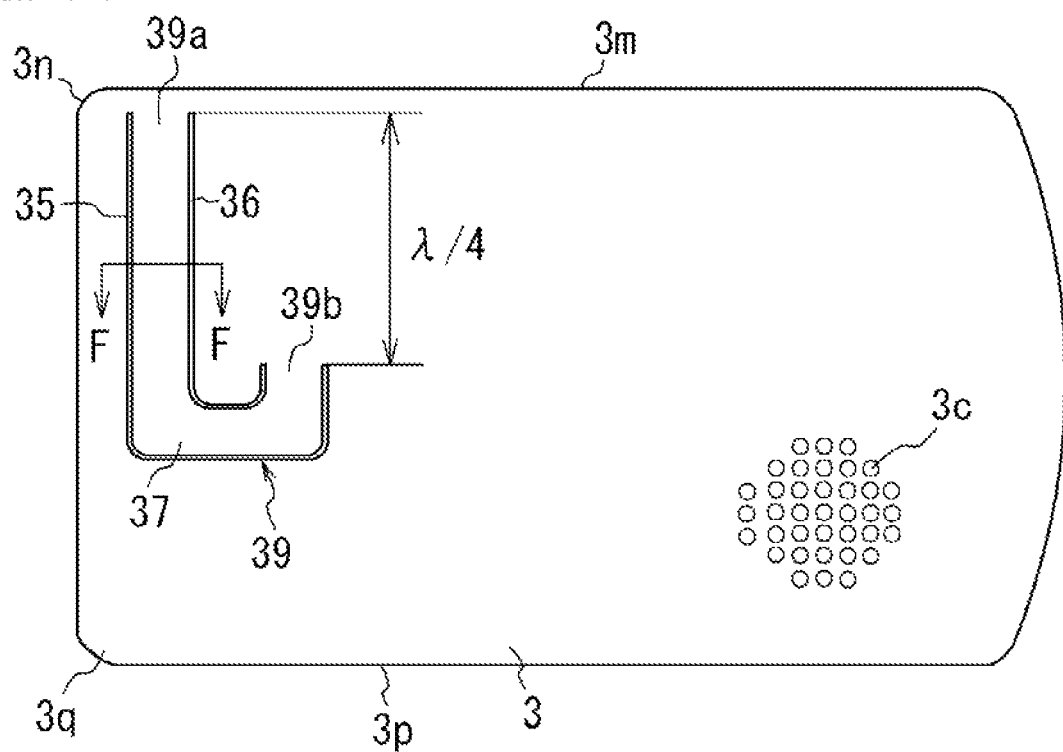
FIG. 14 is a view of a wall portion for forming a J-shaped tube provided on the second panel of the speaker system as viewed from the exterior of the compartment.
Figure 15:
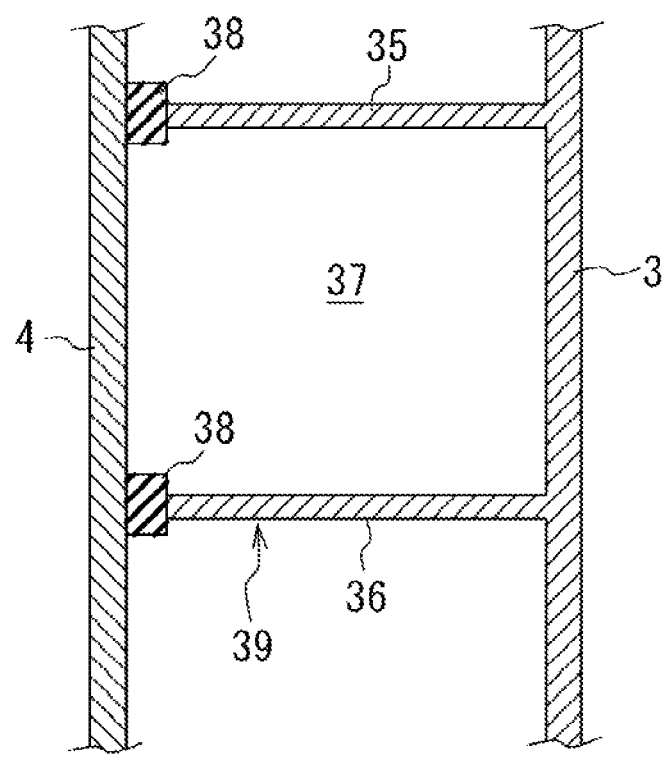
FIG. 15 is a cross-sectional view corresponding to F-F in FIG. 14 and showing a part of the J-shaped tube formed between the second panel and the third panel of the speaker system.

FIGS. 14 and 15 show an example configuration for reducing occurrence of standing waves in an internal space defined by the first panel 2 and the second panel 3. The second panel 3 includes a facing surface that faces the third panel 4. As shown in FIGS. 14 and 15, wall portions 35 and 36 are formed on the facing surface of the second panel 3. Each of the wall portions 35 and 36 extends toward the third panel 4. A groove 37 is formed between the wall portions 35 and 36. The configuration shown in FIGS. 14 and 15 includes packings 38. The wall portion 35 includes a tip end that faces the third panel 4. One of the packings 38 is mounted to the tip end of the wall portion 35. The wall portion 36 includes a tip end that faces the third panel 4. The other of the packings 38 is mounted to the tip end of the wall portion 36. Each of the packings 38 is formed of rubber or similar material. The packings 38 are in contact with the third panel 4. As a result, airtightness between the wall portion 35 and the third panel 4 is increased, and the airtightness between the wall portion 36 and the third panel 4 is also increased. As described above, a tube portion 39 is formed between the second panel 3 and the third panel 4 by the wall portions 35 and 36. The tube portion 39 reduces the occurrence of standing waves in the internal space surrounded by the first panel 2 and the second panel 3.

When sound waves, which have the same frequency as the natural frequency of the enclosure, are output from the speaker 5 into the internal space (into the enclosure), each of the sound waves reciprocates between the walls of the enclosure. Combination of the reciprocating standing waves generates the standing waves SWk (k=1, 2, ... ), dependent on the shape of the internal space defined by the first panel 2 and the second panel 3. The tube portion 39 reduces an occurrence of the standing waves SWk. The tube portion 39 has a tube length that is approximately half of a wavelength of a primary standing wave SW1. The primary standing wave SW1 is lowest in order among the standing waves SWk to be suppressed. The tube portion 39 has a first opening end 39a and a second opening end 39b. The tube portion 39 is bent by 90 degrees at two points between the first opening end 39a and the second opening end 39b. The tube portion 39 is accommodated in the internal space in a shape that satisfies each of a first and second condition.

The first condition is one in which the first opening end 39a is disposed at a first place and the second opening end 39b is disposed at a second place. The first place is a position approximately where an antinode occurs in the standing wave of the lowest order among the standing waves SWk. The second place is a position approximately where a node occurs. The second panel 3 has an upper end portion 3m and a lower end portion 3p. The internal space is surrounded by surfaces that include an upper wall surface and a lower wall surface. The upper wall surface faces the lower wall surface. The upper wall surface is positioned at a side of the upper end portion 3*m*. The lower wall surface is positioned at a side of the lower end portion 3*p*. The second condition is one in which the first opening end 39*a* and the second opening end 39*b* are respectively disposed at positions that are separated from each other by approximately a length that is a quarter of a wavelength of the lowest in order among the standing waves SWk in a direction from the upper wall surface toward the lower wall surface.

In this example, the first opening end 39*a* is positioned at a corner portion 3*n* of the second panel 3. The corner portion 3*n* is positioned on the side of the upper end portion 3*m*. The first opening end 39*a* may be positioned at a corner portion 3*q* of the second panel 3. The corner portion 3*q* is positioned on the side of the lower end portion 3*p*. The first opening end 39*a* is positioned at a location in which a sound pressure is high (an antinode portion of the standing wave). The second opening end 39*b* is positioned at a middle portion of the second panel 3 in the vertical direction, namely, at a position in which a sound pressure is low (a node portion of the standing wave). The distance between the opening ends 39*a* and 39*b* is set to about one quarter ($\lambda/4$) of a wavelength $\lambda$, of the fundamental wave of the standing wave.

As shown in FIGS. 14 and 15, in a construction in which the tube portion 39 is formed between the second panel 3 and the third panel 4, standing waves that occur between the first panel 2 and the second panel 3, which together define the enclosure, are suppressed, and as a result the sound quality is improved. The wall portions 35 and 36 may be provided on the third panel 4. Further, the direction of the J-shaped tube portion 39 need not be the vertical direction.

2. Second Embodiment

Figure 16:
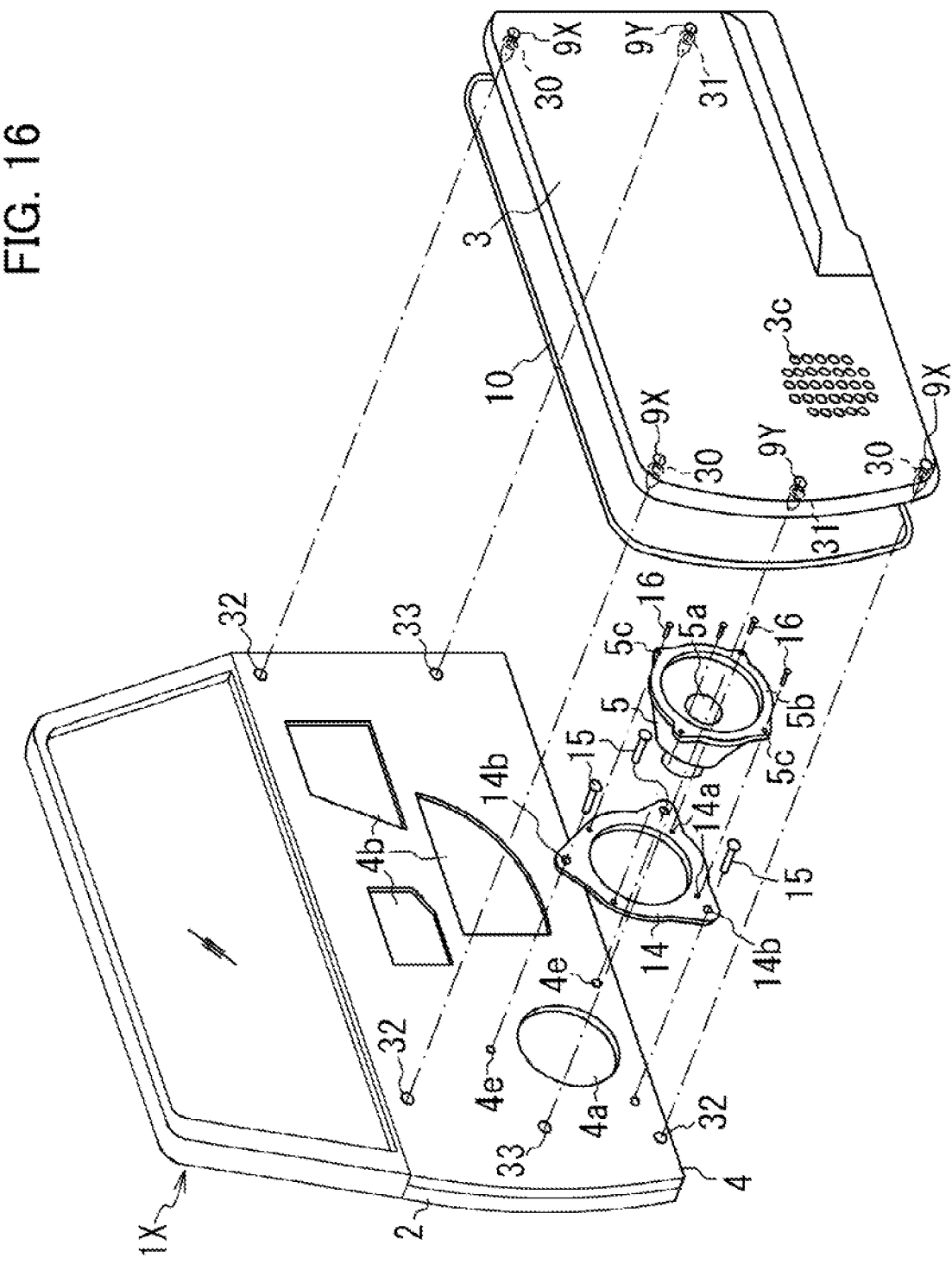
FIG. 16 is an exploded perspective view showing a vehicle door housing a speaker system according to a second embodiment.
Figure 17:
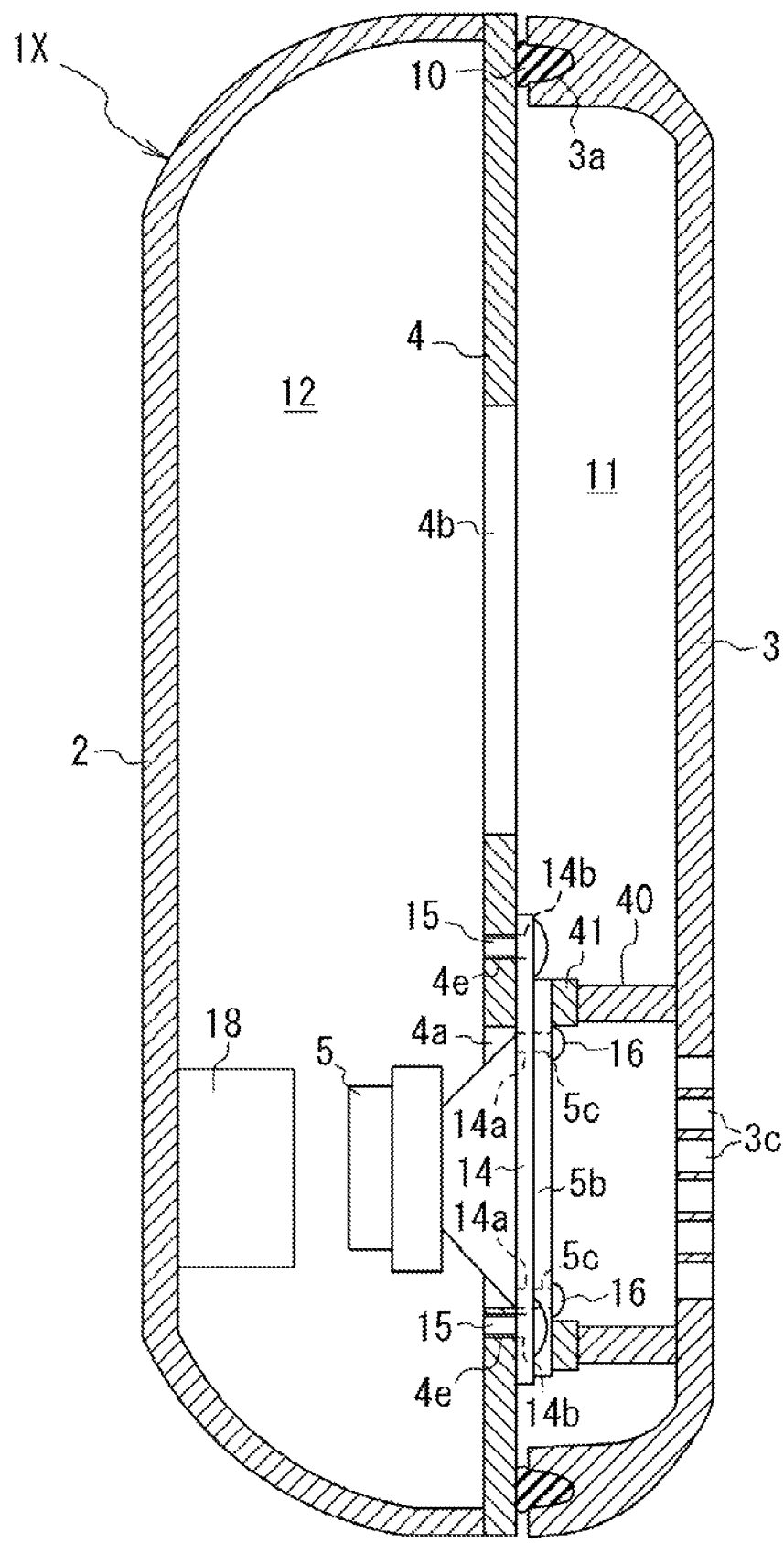
FIG. 17 is a longitudinal sectional view of the speaker system.

In the above-described first embodiment, the speaker 5 is mounted to the second panel 3. It is of note that the second embodiment differs from the first embodiment in that the speaker 5 is mounted to the third panel 4. FIGS. 16 and 17 show a speaker system and a vehicle door 1X according to the second embodiment. In FIGS. 16 and 17, like reference numerals to those in FIG. 1 or 2 are used to denote the same components. In the second embodiment, the through-hole 4*a* and the through-holes 4*b* are formed in the third panel 4. The through-hole 4*a* accommodates the speaker 5. One of the through-holes 4*b* accommodates the door lock actuator (not shown), or the motor for vertically moving the window glass 6. The second panel 3 is mounted to the third panel 4. The outer edge portion of the second panel 3 is detachably fixed to the third panel 4 by the coupling members 9X and 9Y. Each of the coupling members 9X and 9Y includes the male member 9*a* and the female member 9*b* shown in FIGS. 10 and 11. At least one of the uncovered through-holes 4*b* serves to communicate the space 11 defined between the second panel 3 and the third panel 4 with the space 12 defined between the first panel 2 and the third panel 4.

To mount the speaker 5 to the third panel 4, the mounting member 14 is used in the second embodiment as well as in the first embodiment. The mounting member 14 is provided with the screw holes 14*a* and the holes 14*b*. The screw holes 14*a* are used to mount the speaker 5 to the second panel 3 with the screws 16. The holes 14*b* are used to mount the mounting member 14 to the third panel 4 with the screws 15. The speaker 5 has the flange 5*b*. In the third panel 4, screw holes 4*e* are formed. When one of the screws 16 is screwed into one of the screw holes 14*a* through one of the holes 5*c*, the mounting member 14 is mounted to the speaker 5; and when one of the screws 15 is screwed into one of the screw holes 4*e* through one of the holes 14*b*, the speaker 5 and the mounting member 14 are mounted to the third panel 4.

The second panel 3 includes a region that faces the sound-outputting surface 5*a*. The holes 3*c* are formed in the region that faces the sound-outputting surface 5*a*. Each of the holes 3*c* is used to output sound, which is output from the speaker 5, into the compartment. The sound absorbing member 18 is mounted to the surface of the first panel 2, specifically to the surface that faces the back surface of the speaker 5. The sound absorbing member 18 inhibits occurrence of standing waves.

Further, in the second embodiment, a sound insulation tubular body 40 is mounted to the second panel 3. The tubular body 40 inhibits sound output from the speaker 5 from entering into the space 11 between a portion of the second panel 3, in which the speaker 5 is not mounted, and the third panel 4. The tubular body 40 includes a tip end. The tip end of the tubular body 40 is in contact with the flange 5*b* via a packing 41. The tip end of the tubular body 40 presses against the flange 5*b*. As a result, the airtightness between the tubular body 40 and the flange 5*b* is maintained.

In the speaker system in which the speaker 5 is mounted to the third panel 4 as shown in FIGS. 16 and 17, the enclosure for the speaker 5 is defined by a space formed by the space 12 with the space 11, as well as in the speaker system in which the speaker 5 is mounted to the second panel 3 as shown in FIGS. 1 and 2. The space 12 is defined between the first panel 2 and the third panel 4. The space 11 is defined between the second panel 3 and the third panel 4. Accordingly, it is possible to increase an area volume of the enclosure (the cabinet volume) that houses the speaker 5. As a result, a level of a lowest resonance frequency can be reduced and the sound pressure across the low sound range can be increased.

In the second embodiment shown in FIGS. 16 and 17, when at least one of the constructions shown in FIGS. 3 to 15 is employed, effects such as improvement in the sound quality and improvement in the airtightness can be realized, as has been explained with reference to the figures. In the second embodiment illustrated in FIGS. 16 and 17, the third panel 4 may include the mounting portion 3*d*, to which the speaker 5 is mounted, and the portion 3*e* to which the speaker 5 is not mounted. When the mounting portion 3*d* of the third panel 4 is thicker than the portion 3*e* of the third panel 4, a mass of the mounting portion 3*d* increases and as a result rigidity of the mounting portion 3*d* increases. Thus, even when the speaker 5 vibrates substantially, it is nonetheless possible to restrain vibration in the third panel 4. Thus, it is possible to inhibit occurrence of enclosure noise, thereby improving the sound quality.

In the second embodiment shown in FIGS. 16 and 17, when the second panel 3 includes a core material having the honeycomb structure or the foam structure shown in FIG. 5 or 7, it is possible to decrease a level of sound that passes through the second panel 3 after being output from the back surface of the speaker 5. Consequently, the sound quality can be improved.

In the second embodiment shown in FIGS. 16 and 17, when the support column 26 or 28 that supports the second panel 3 is provided as shown in FIG. 8 or 9, it is possible to restrain vibration of the second panel 3. As a result, it is possible to inhibit occurrence of enclosure noise, and consequently, the sound quality can be improved.

In the second embodiment shown in FIGS. 16 and 17, in a state in which the second panel 3 is separated from the third panel 4, as shown in FIGS. 10 and 11, the portion 3*h* of the second panel 3 may be bent toward the third panel 4.

In this case, it is possible to increase adhesion and airtightness between the second panel 3 and the third panel 4, and thus to inhibit sound from leaking through the gap between the second panel 3 and the third panel 4. By increasing the airtightness of the enclosure defined by the spaces 11 and 12, and minimizing undesirable variations in the sound quality, the sound quality is improved.

In the second embodiment shown in FIGS. 16 and 17, the structure as shown in FIG. 12 may be employed in which the packings 10a and 10b are provided on the packing mounting portions 3i and 3j respectively. In the second embodiment shown in FIGS. 16 and 17, the structure as shown in FIG. 13 may be employed in which the protuberance 4d of the third panel 4 is in contact with the packing 10c that is provided in the packing mounting portion 3k of the second panel 3 while pressing against the packing 10c. In such a case, since vibration of the second panel 3 is restrained, enclosure noise is restrained, and the sound quality can be improved.

In the second embodiment shown in FIGS. 16 and 17, the structure having the tube portion 39 may be employed as shown in FIGS. 14 and 15. The tube portion 39 reduces occurrence of standing waves in the space defined between the first panel 2 and the second panel 3. When such a tube portion 39 is provided, it is possible to reduce occurrence of standing waves in the enclosure for the speaker 5, and to improve the sound quality.

The above-described examples are merely representative forms of the present disclosure. The present disclosure is not limited to the above-described examples, and various modifications and additions can be made in so far as they do not depart from the spirit of the present disclosure.

3. Third Embodiment

Figure 18:
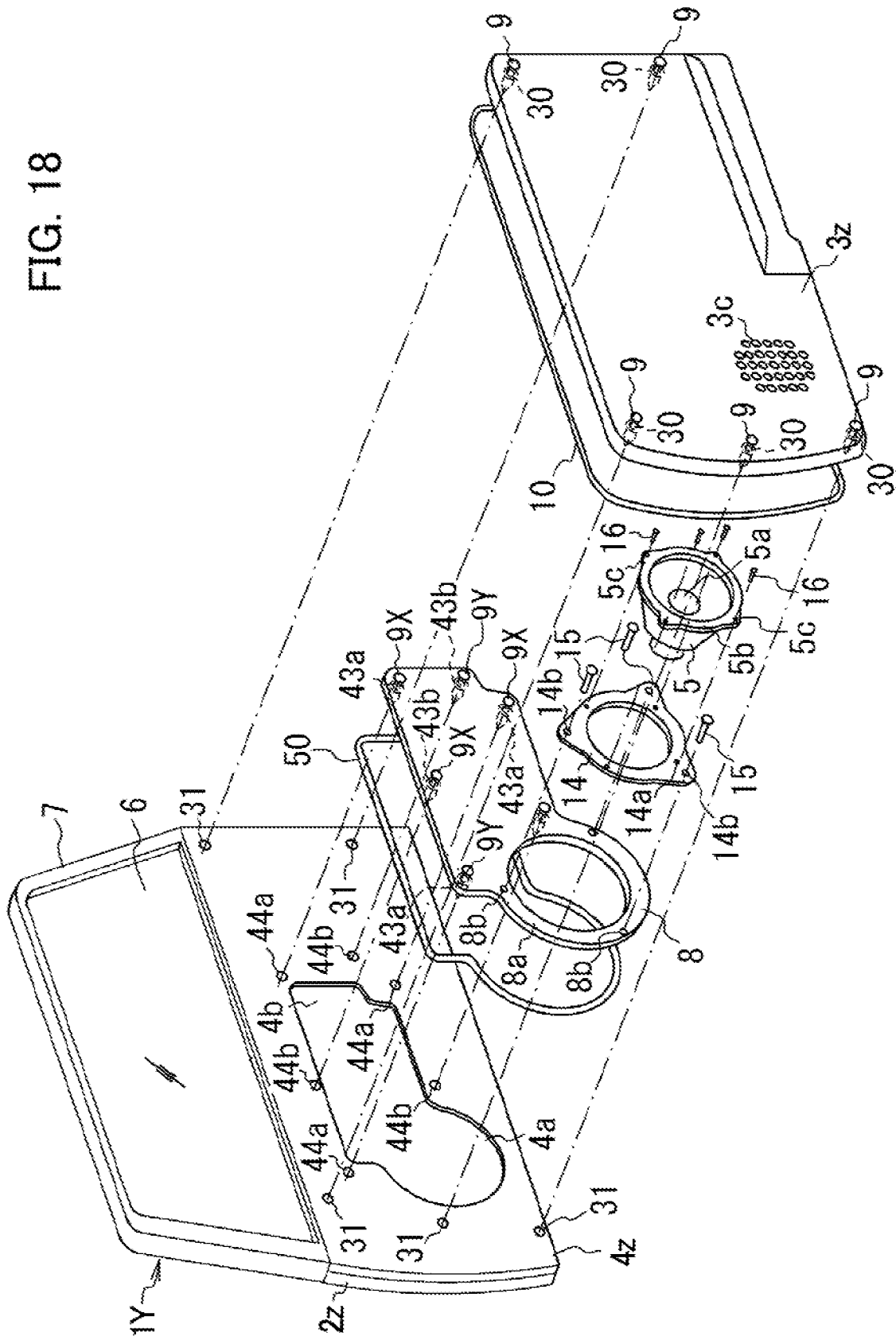
FIG. 18 is an exploded perspective view showing a vehicle door housing a speaker system according to a third embodiment.

FIG. 18 is an exploded perspective view showing configurations of a speaker system and a vehicle door according to the third embodiment. A vehicle door 1Y has a compartment. As shown in the figure, the vehicle door 1Y includes a first panel 2z, a second panel 3z, a third panel 4z, a carrier module 8, and the speaker 5. The first panel 2z is referred to as an outer panel. The first panel (the outer panel) 2z constitutes the vehicle door 1Y. The second panel 3z constitutes the vehicle door 1Y. The second panel 3z is an interior material. The second panel 3z is situated closer to the compartment than the first panel 2z. The second panel 3z is referred to as a door trim. The third panel 4z constitutes the vehicle door 1Y. The third panel 4z is arranged between the first panel 2z and the second panel 3z. The third panel 4z is situated closer to the compartment than the first panel 2z. The third panel 4z is referred to as an inner panel. The carrier module 8 is mounted to the third panel 4z. The third panel 4z is arranged between the first panel 2z and the carrier module 8 to form a space, which is formed between the first panel 2z and the third panel 4z, and a space which is formed between the carrier module 8 and the third panel 4z. The carrier module 8 is an example of a panel member. The speaker 5 has the sound-outputting surface 5a which outputs sound toward the compartment. The speaker 5 is mounted in the carrier module 8. After the speaker 5 is mounted to the carrier module 8, the carrier module 8 is mounted to the third panel 4z. The carrier module 8 is arranged between the third panel 4z and the second panel 3z. In a situation in which the carrier module 8, on which the speaker 5 is mounted, is mounted to the third panel 4z, the carrier module 8 together with at least the first panel 2z constitutes a speaker enclosure, that is, the enclosure for the speaker 5.

Generally, the first panel 2z and the third panel 4z are each formed from steel plate. The first panel 2z includes an outer edge portion. The outer edge portion of the first panel 2z is coupled with the third panel 4z. Generally, the second panel 3z is formed from a synthetic resin molded plate. The carrier module 8 may be formed from steel plate or a synthetic resin molded plate. Each of the first panel 2z and the third panel 4z may be formed from an aluminum alloy or a carbon material. However, in the present disclosure, the materials of the panels 2z, 3z, and 4z are not limited to the above-described materials. To the first panel 2z and the third panel 4z, the frame body 7 is mounted. The frame body 7 houses the window glass 6 that is vertically movable.

In the third panel 4z, the through-hole 4a and the through-holes 4b are formed. The speaker 5 is inserted into the through-hole 4a. One of the through-holes 4b each accommodates a door lock actuator (not shown) and a motor for vertically moving the window glass 6. The through-hole 4a and the through-holes 4b communicate the space formed between the first panel 2z and the third panel 4z, with the space formed between the carrier module 8 and the third panel 4z. In the example shown in FIGS. 18 and 19, the through-hole 4a and the through-holes 4b are formed to communicate with each other, but the through-hole 4a may be formed independent of the through-holes 4b, or vice versa, or only the through-holes 4b may be formed.

The speaker 5 is mounted to the carrier module 8 via the mounting member 14. Door mounting components, such as the motor and the door lock actuator, are mounted to the carrier module 8. Further, the carrier module 8 has an annular mounting portion 8a for accommodating the speaker 5. The mounting member 14 has an annular shape. The mounting member 14 is provided with the screw holes 14a and the holes 14b. The screw holes 14a are used to mount the speaker 5 to the mounting member 14 with the screws 16. The holes 14b are used to mount the mounting member 14 to the carrier module 8 with the screws 15. The screw holes 8b are formed in the carrier module.

The speaker 5 has the flange 5b. The flange 5b has the holes 5c. When one of the screws 16 is screwed into one of the screw holes 14a through one of the holes 5c, the mounting member 14 is mounted to the speaker 5. When one of the screws 15 is screwed into one of the screw holes 8b through one of the screw holes 14b, the speaker 5 and the mounting member 14 are mounted to the carrier module 8. The second panel 3z includes a facing region that faces the sound-outputting surface 5a of the speaker 5. Holes 3c are formed in the facing region of the second panel 3z.

The speaker 5 includes the back surface. The first panel 2z includes the facing surface that faces the back surface of the speaker 5. The sound absorbing member 18 is mounted to the facing surface of the first panel 2z.

Figure 19:
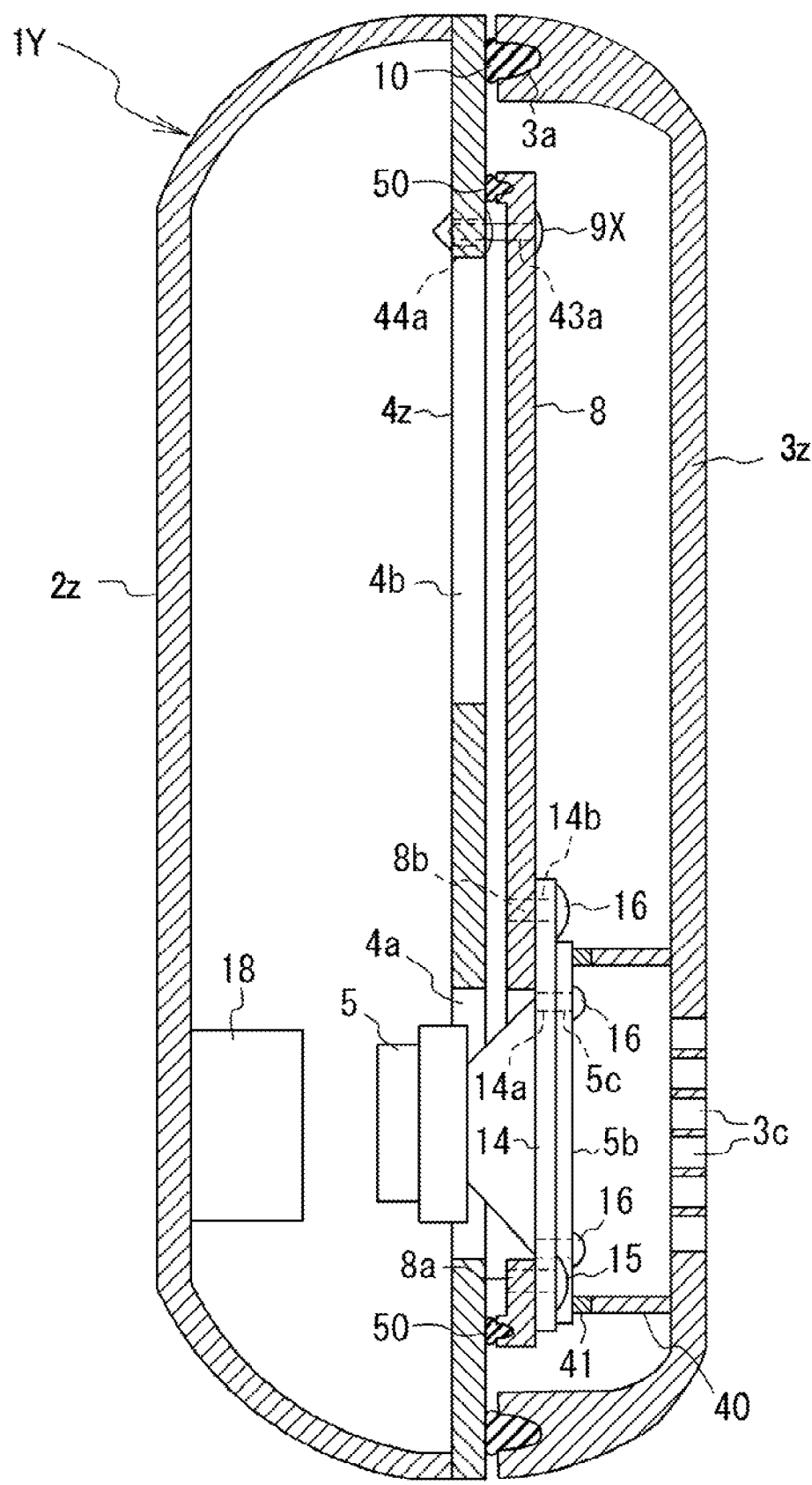
FIG. 19 is a longitudinal sectional view of the speaker system.

As shown in FIG. 19, the sound insulation tubular body 40 is mounted to the facing surface of the second panel 3z. The tubular body 40 inhibits sound output from the speaker 5 from entering the space 11a defined between a portion of the carrier module 8, in which the speaker 5 is not mounted, and the second panel 3z. The tip end of the tubular body 40 is in contact with the flange 5b via the packing 41. The tip end of the tubular body 40 is pressed against the flange 5b. Thus, the airtightness between the tubular body 40 and the flange 5b is maintained.

As will be described later with reference to FIGS. 28 and 29, after the speaker 5 is mounted to the carrier module 8, the carrier module 8 is mounted to the third panel 4z via a packing 50 by the coupling members 9X and 9Y. A first hole 43a and a second hole 43b are formed in the carrier module

8. A first hole 44*a* and a second hole 44*b* are formed in the third panel 4*z*. In this case, the coupling member 9X is fitted into the first hole 44*a* after the coupling member 9X passes through the first hole 43*a*. The coupling member 9Y is fitted into the second hole 44*b* after the coupling member 9Y passes through the second hole 43*b*.

A coupling member 9 fixes the second panel 3*z* to the third panel 4*z*. The coupling member 9 has the same structure as the coupling members 9X and 9Y. As shown in FIGS. 28 and 29, the coupling member 9 includes the male members 9*a* and the female members 9*b*. The outer edge portion of the second panel 3*z* is detachably fixed to the third panel 4*z* by the coupling member 9. As shown in FIG. 19, the groove 3*a* is formed in the outer edge portion of the second panel 3*z* along the outer edge portion. The groove is an example of a packing mounting portion. That is, the packing mounting portion is a groove-like recessed portion. The packing 10 is fitted into the groove 3*a*. The packing 10 maintains the airtightness of the space 11*a* between the second panel 3*z* and the third panel 4*z*.

In the speaker system shown in FIGS. 18 and 19, a space 12 is formed by merging the space defined between the first panel 2*z* and the third panel 4*z* with the space defined between the carrier module 8 and the third panel 4*z*. The space 12 serves as an enclosure space for the speaker 5. In this way, the enclosure for the speaker 5 is constituted by the first panel 2*z* and the carrier module 8; more specifically, the first panel 2*z*, the third panel 4*z*, and the carrier module 8.

In the speaker system shown in FIGS. 18 and 19, the through-hole 4*a* and the through-holes 4*b* of the third panel 4*z* may be covered with the carrier module 8 mounted to the third panel 4*z*, thereby forming the enclosure for the speaker 5. In the case that the enclosure is formed by covering the through-hole 4*a* and the through-holes 4*b* with the carrier module 8, there is no need to use a dedicated member for covering any of the through-holes. As a result need for attaching or detaching a covering member, or the like is obviated, and a maintenance procedure requiring assembly or disassembly of the speaker system is simplified.

By use of the configuration described in the following example, the sound quality can be further improved. In the example described in FIGS. 20 and 21, the carrier module 8 includes a mounting portion 8*d* and a portion 8*e*. The speaker 5 is mounted to the mounting portion 8*d*. The mounting portion 8*d* is an example of a first portion. The speaker 5 is not mounted to the portion 8*e*. The portion 8*e* is an example of a second portion. The thickness W1*a* of the mounting portion 8*d* is greater than the thickness W2*a* of the portion 8*e*. As described above, when the mounting portion 8*d* is thicker than the portion 8*e*, the mass of the mounting portion 8*d* increases and the rigidity of the mounting portion 8*d* increases. Therefore, even when the speaker 5 vibrates substantially, it is possible to restrain vibration of the carrier module 8. Accordingly, it is possible to inhibit enclosure noise, and thereby improve the sound quality.

Figure 20:
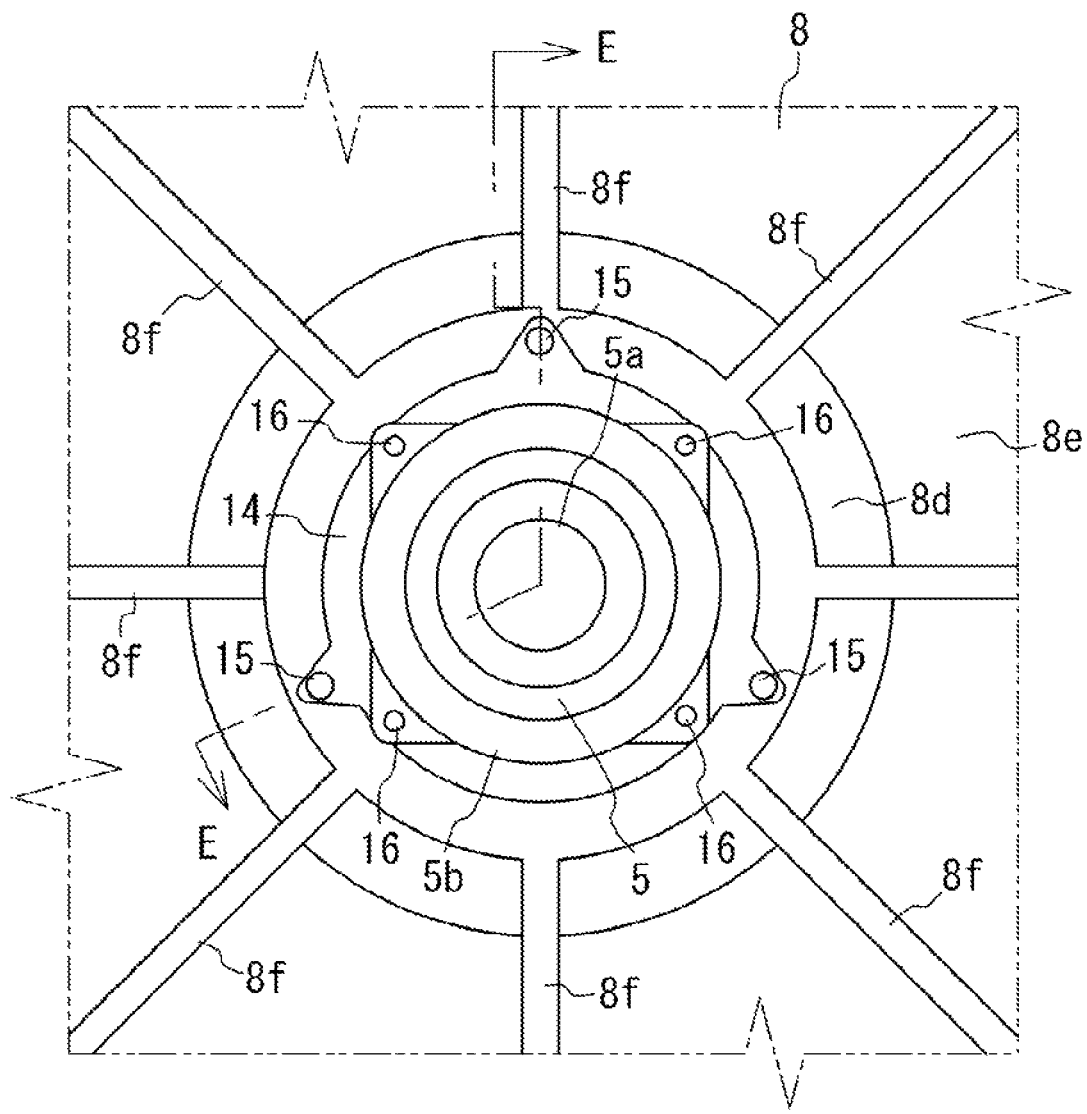
FIG. 20 is a view of another example of the mounting structure of the speaker of the speaker system as viewed from the compartment.
Figure 21:
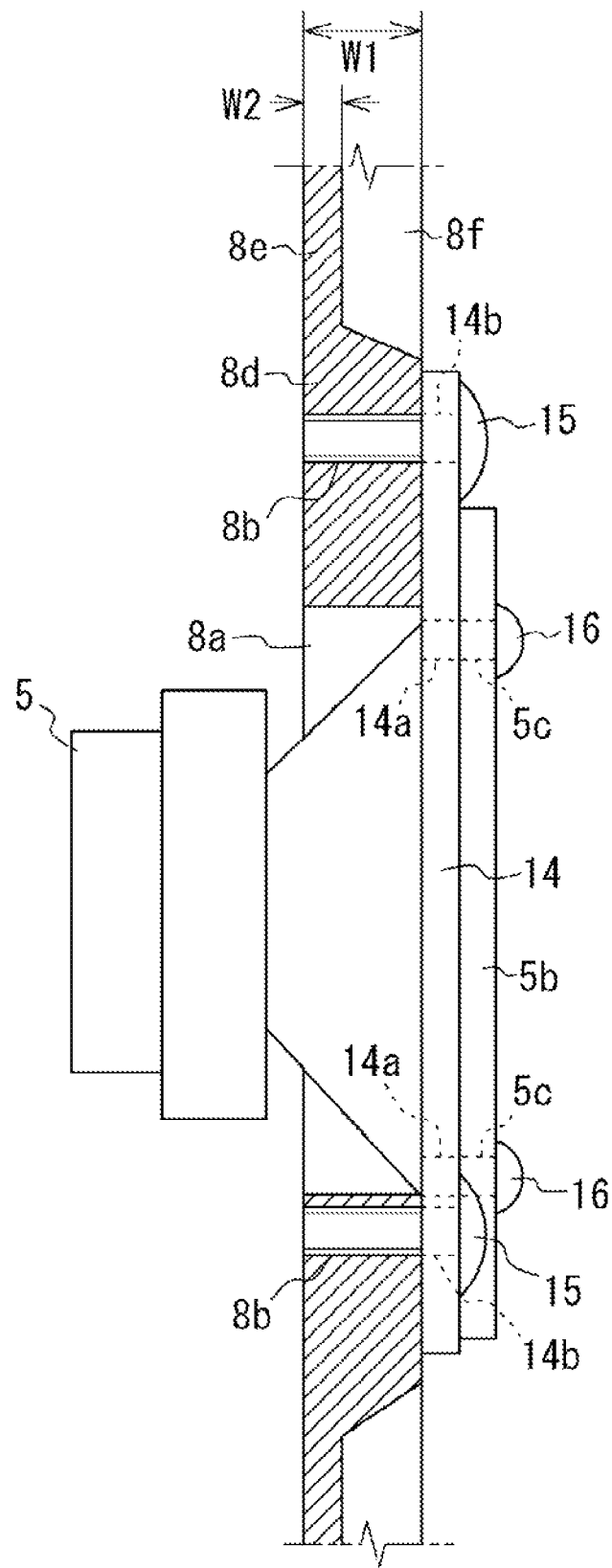
FIG. 21 is a cross-sectional view taken along line E1-E1 of FIG. 20.

Further, in the example of FIGS. 20 and 21, the carrier module 8 includes ribs 8*f*. Each of the ribs 8*f* is formed as one piece with the mounting portion 8*d*. The ribs 8*f* are formed radially about the mounting portion 8*d*. In this way, when the ribs 8*f* which are continuous with the mounting portion 8*d* are formed, the rigidity of the carrier module 8 is further increased. Thus, an effect further increases in which the vibration of the carrier module 8 is restrained, and the sound quality can be further improved. In order to thicken the mounting portion 8*d*, a wood, synthetic resin, or a metal ring may be adhered to the carrier module 8 with an adhesive.

Figure 22:
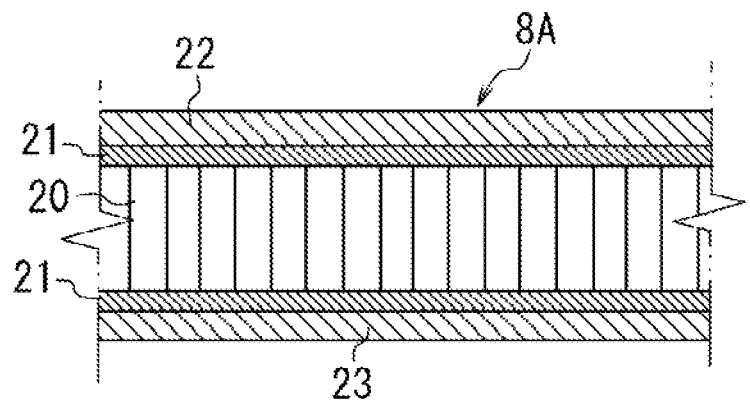
FIG. 22 is a cross-sectional view showing an example of the carrier module comprising the speaker system.
Figure 23:
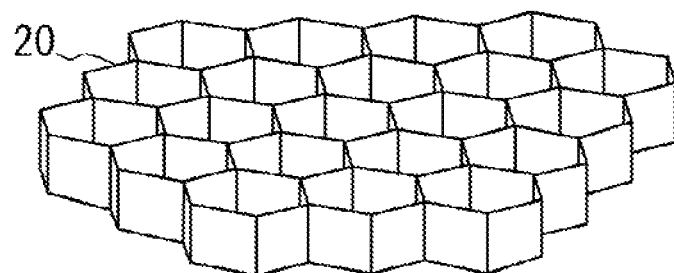
FIG. 23 is a perspective view showing a honeycomb structure used in the carrier module shown in FIG. 22.

FIG. 22 shows an example of another carrier module 8A for obtaining the effect in which vibration is restrained. The carrier module 8A includes the plate-shaped core material (an inner member) 20, the adhesives 21, the surface material 22 and the back-surface material 23. The core material 20 has a honeycomb structure shown in FIG. 23. The core material 20 includes the first surface and the second surface opposing o the first surface. Each of the surface material 22 and the back-surface material 23 is formed of a metal or a synthetic resin or the like. The surface material 22 is adhered to the first surface of the core material 20 with one of the adhesives 21. The back-surface material 23 is adhered to the second surface of the core material 20 with the other of the adhesives 21.

As described above, when the plate-shaped core material 20 has the honeycomb structure, the carrier module 8A is light weight and highly rigid. Thus, transmission loss in the low sound range increases. As a result, it is possible to inhibit sound that passes through the carrier module 8A from being output from the back surface of the speaker 5. Consequently, the sound quality can be improved. In the configuration of FIG. 22, when the adhesives 21 are rubber-based adhesives having elastic properties, an effect by which vibration is restrained can be increased.

Figure 24:
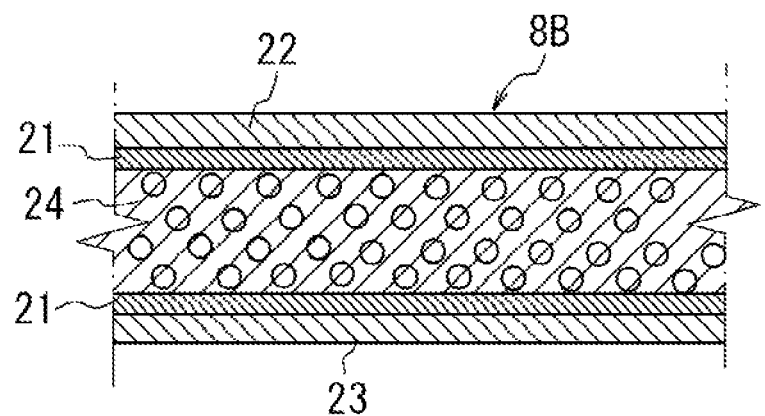
FIG. 24 is a cross-sectional view showing another example of the carrier module comprising the speaker system.

FIG. 24 shows an example of another carrier module 8B for obtaining the effect in which the vibration is restrained. In the carrier module 8B, the core material 24 is used instead of the core material 20. The core material 24 has a foam structure, such as a synthetic resin. The core material 24 includes a front surface and a back surface opposing the front surface. The surface material 22, which is formed from a synthetic resin or a metal, is adhered to the front surface of the core material 24 with one of the adhesives 21. The back-surface material 23, which is formed from a synthetic resin or the like, is adhered to the back-surface of the core material 24 with the other of the adhesives 21.

In a construction in which the core material 24 has a foam structure, a part of energy of the vibration is expended on expansion and contraction of bubbles in the core material 24 having the foam structure. As a result, transmission loss in the low sound range increases, and thus it is possible to inhibit sound that passes through the carrier module 8B after being output from the back surface of the speaker 5. Consequently, the sound quality can be improved. When the core material 24 has independent bubbles separated by partition walls, it is possible to impart properties of light weight and the high rigidity.

In addition to the above-described example, when the mounting portion of the carrier module 8 is formed of a material that is strongly resistant to vibration, such as a highly elastic member, vibration of the carrier module 8 can be effectively restrained. When such a material is adopted in addition to the configuration of the mounting portion 8*d* having a large thickness as described above, the configuration of the mounting portion 3*d* coupling to the ribs 8*f*, or the like, an effect, in which the vibration is further restrained, can be attained. The carrier module 8 includes a front surface and a back surface. The front surface of the carrier module 8 is provided on a compartment side (the surface material 22 side) of the carrier module 8. The back surface of the carrier module 8 is positioned on a side (the back-surface material 23 side) opposing the compartment side of the carrier module 8. It is possible to further increase the rigidity of the carrier module 8 when the ribs 8*f* are also provided on the front surface of the carrier module 8, on the back surface of the carrier module 8, or on both the front surface and the back surface of carrier module 8 in a situation in which the carrier module 8 has the core material 20 having a honeycomb structure or the core material 24 having a foam structure. Therefore, the sound quality can be further improved.

Figure 25:
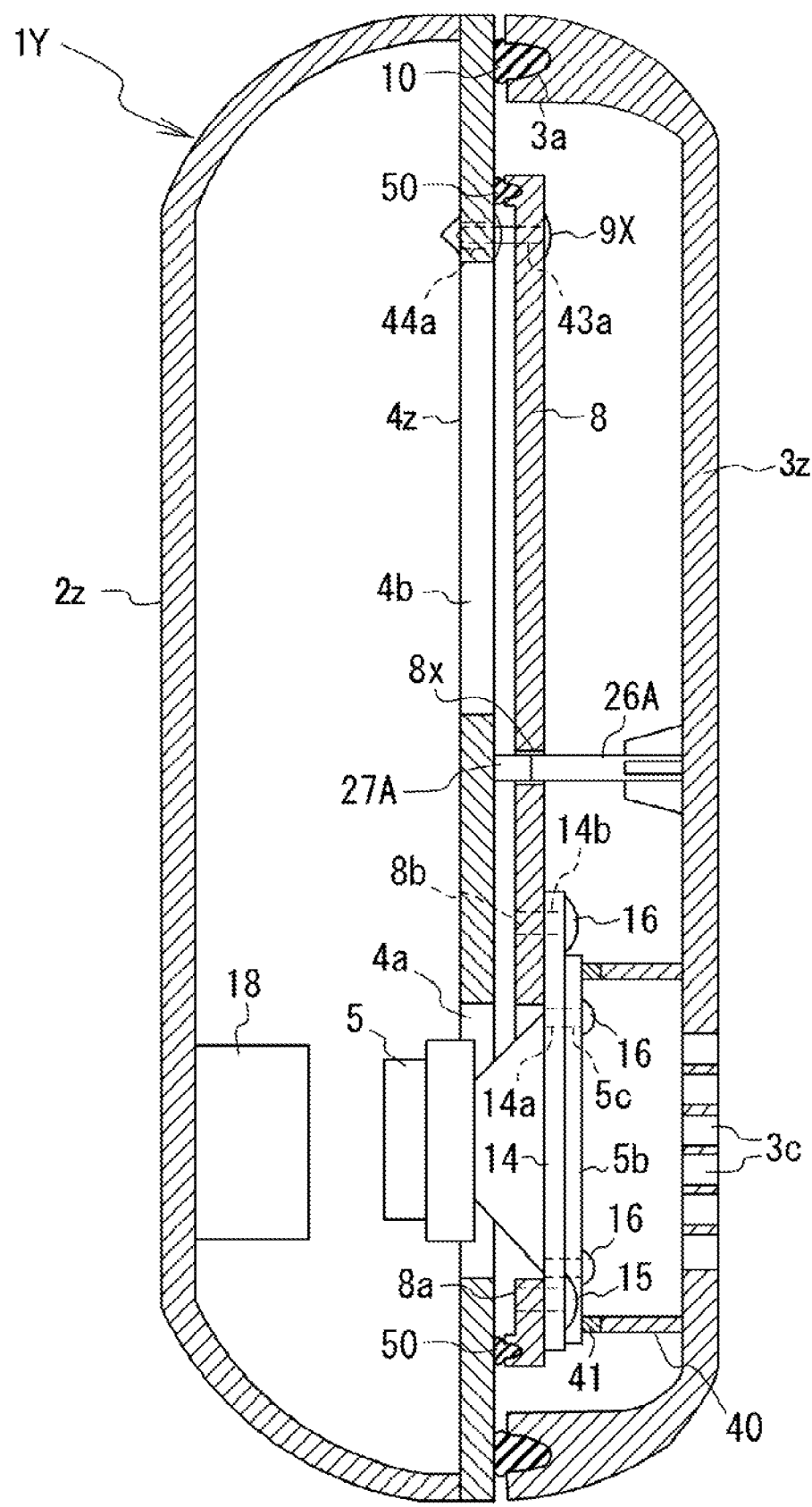
FIG. 25 is a longitudinal sectional view showing an example of a reinforcing structure of the second panel of the speaker system.

FIG. 25 shows another configuration example of the speaker system in which the vibration of the second panel 3z is restrained. In this configuration example, a support column 26A is provided between the second panel 3z and the third panel 4z. The support column 26A presses the second panel 3z toward the compartment. The support column 26A is configured to support the second panel 3z and the third panel 4z. This support column 26A and the second panel 3z are unitarily formed. The support column 26A includes a tip end. A packing 27A is mounted to the tip end of the support column 26A. The packing 27A is formed of a material having elastic properties, such as rubber. The packing 27A is in contact with the third panel 4z. A hole 8x, through which the support column 26A or the packing 27A passes, is formed in the carrier module 8. The packing 27A and the support column 26A may be unitarily formed.

When such a support column 26A supports the second panel 3z, vibration of the second panel 3z, which faces the compartment, is restrained. As a result, enclosure noise is restrained, and the sound quality can be improved. Further, since the vibration of the second panel 3z is restrained, increasing a thickness of the second panel 3z or providing ribs 27, for example, does not need to be employed.

In the configuration shown in FIG. 25, since the packing 27A has elastic properties, the packing 27A exhibits a first effect by which a supporting force for pressing the second panel 3z is appropriately adjusted, and a second effect by which the vibration is decreased. The support column 26A and the second panel 3z need not be unitarily formed. The support column 26A and the third panel 4z may be unitarily formed. However, when the second panel 3z is formed from a synthetic resin and the third panel 4z is formed from a steel plate, the support column 26A and the second panel 3z can be unitarily formed with ease by integral molding. Therefore, it is advantageous for the manufacture process to form the support column 26A and the second panel 3z unitarily. Further, it is advantageous to provide the support column 26A as close to the center of the second panel 3z as possible to restrain vibration. Furthermore, it is advantageous to provide the support column 26A on a flat plate portion of the second panel 3z to obtain restrain vibration. In addition, more than one support column may be provided.

Figure 26:
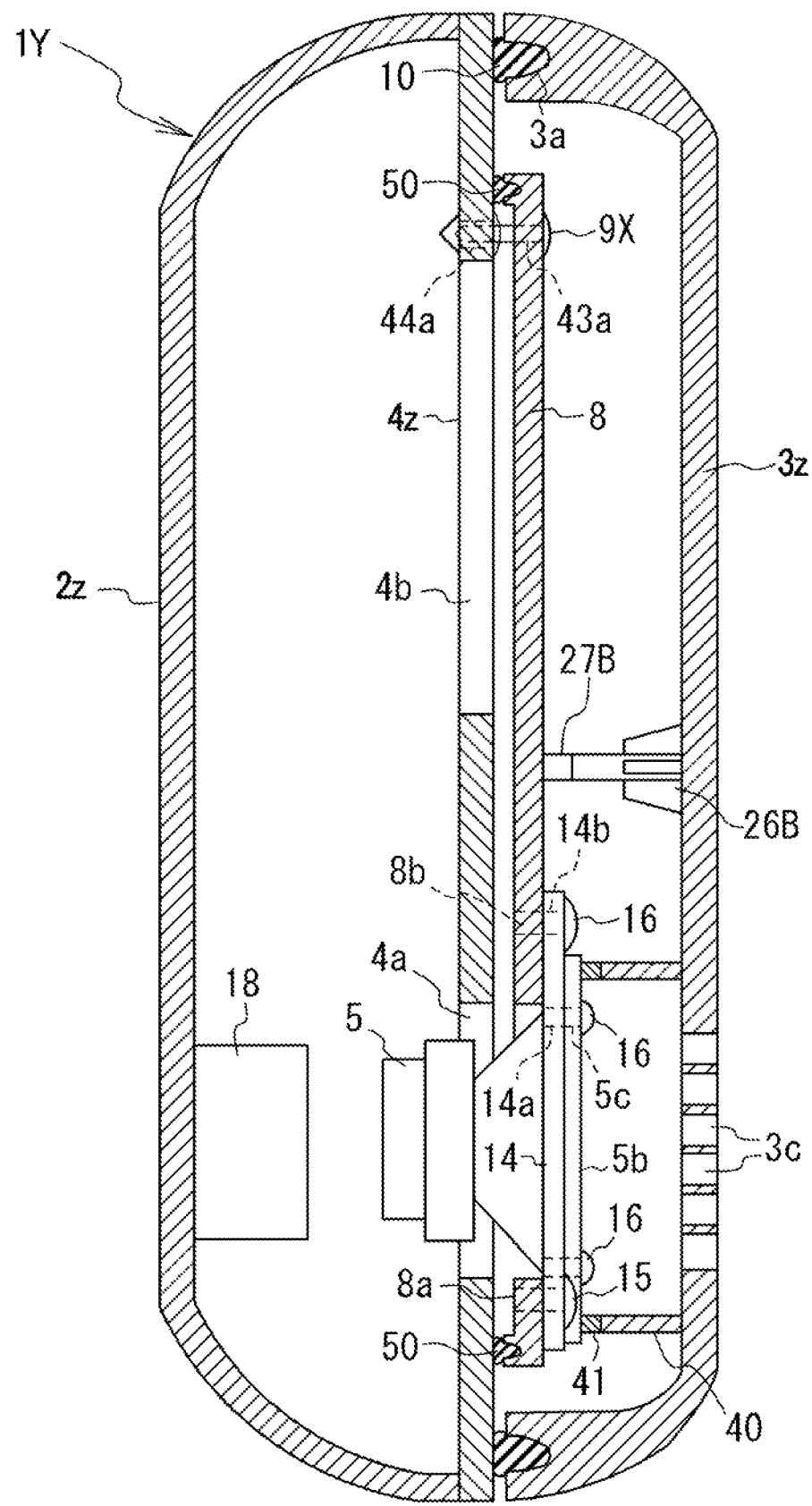
FIG. 26 is a longitudinal sectional view showing another example of the reinforcing structure of the second panel of the speaker system.

FIG. 26 shows another configuration example of the speaker system for restraining vibration of the second panel 3z. This configuration example includes a support column 26B, which presses the second panel 3z toward the compartment. The support column 26B is arranged between the second panel 3z and the carrier module 8. The support column 26B is configured to support the second panel 3z and the carrier module 8. The support column 26B and the second panel 3z are unitarily formed. The support column 26B includes a tip end. A packing 27B is mounted to the tip end of the support column 26B. The packing 27B is formed of a material having elastic properties such as rubber. The packing 27B is in contact with the carrier module 8.

When such a support column 26B supports the second panel 3z, the vibration of the second panel 3z, which faces the compartment, is restrained. Therefore, enclosure noise can be restrained, and the sound quality can be improved. Also in the configuration example shown in FIG. 26, as well as in the configuration example shown FIG. 25, the vibration of the second panel 3z is restrained.

In the configuration shown in FIG. 26, since the packing 27B has elasticity, the packing 27B exhibits an effect in which the supporting force for pressing the second panel 3z is appropriately adjusted, and vibration is restrained. The support column 26B and the second panel 3z need not be unitarily formed. The support column 26B and the carrier module 8 may be unitarily formed. When the second panel 3z is formed from a synthetic resin and the carrier module 8 is formed from a steel plate, the support column 26B and the second panel 3z can be unitarily formed with ease by use of integral molding. Thus, for manufacture it is advantageous to form the support column 26B and the second panel 3z unitarily. Additionally, it is advantageous to provide the support column 26B as close to the center of the second panel 3z as possible so as to restrain vibration. Moreover, it is advantageous to provide the support column 26B on the flat plate portion of the second panel 3z so as to further restrain vibration. Moreover, more than one support column 26B may be provided.

Figure 27:
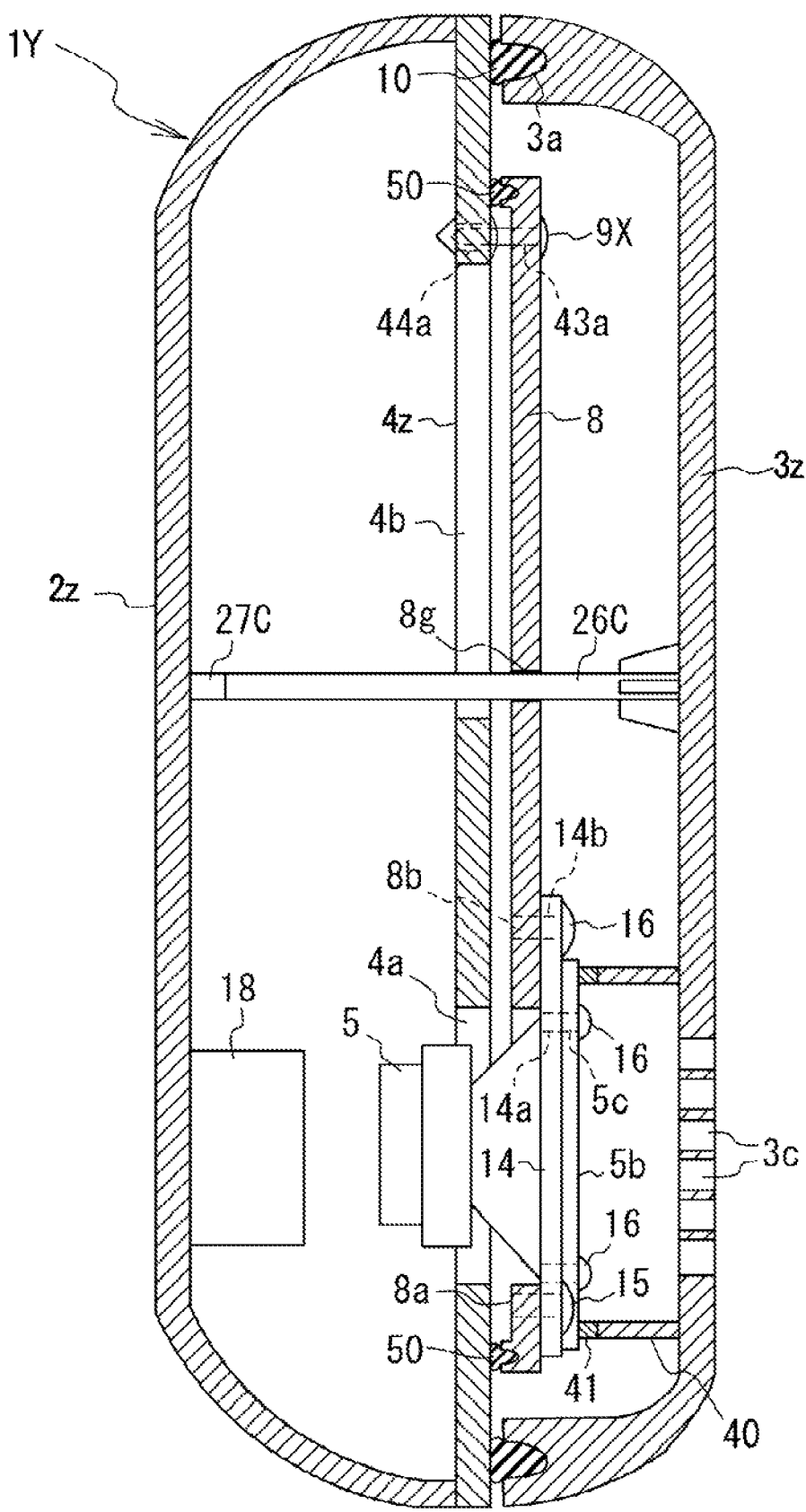
FIG. 27 is a longitudinal sectional view showing yet another example of the reinforcing structure of the second panel of the speaker system.

FIG. 27 shows another example configuration of the speaker system for restraining vibration of the second panel 3z. The example configuration includes a support column 26C arranged between the second panel 3z and the first panel 2z. The support column 26C presses against the second panel 3z toward the compartment. The support column 26C is configured to support the second panel 3z and the first panel 2z. The support column 26C and the second panel 3z are unitarily formed. A through-hole 8g is formed in the carrier module 8. The support column 26C passes through the through-hole 8g and at least one of the through-holes 4b formed in the third panel 4z. The support column 26C includes a tip end. A packing 27C is mounted to the tip end of the support column 26C. The packing 27C is formed of a material having elastic properties such as rubber. The packing 27C is in contact with the first panel 2z.

When a thus-configured support column 26C is used to support the second panel 3z, vibration of the second panel 3z, which faces the compartment, is restrained along with enclosure noise, and thus sound quality is improved. In the example configuration shown in FIG. 27, as well as in the example configuration shown in FIG. 25 or FIG. 26, vibration of the second panel 3z is inhibited. Thus, it is not always necessary to take a measure such as increasing a thickness of the second panel 3z or providing the ribs. As a result, it is possible to lighten a weight of the second panel 3z.

Further, since the packing 27C has elastic properties, the packing 27C exhibits a first effect, by which the supporting force for pressing the second panel 3z is appropriately adjusted, and a second effect by which the vibration is restrained. The support column 26C and the second panel 3z need not be unitarily formed. The support column 26C and the first panel 2z may be unitarily formed. However, when the second panel 3z is formed from a resin and the first panel 2z is formed from a steel plate, the support column 26C and the second panel 3z can be unitarily formed with ease by integral molding. Thus, for manufacture it is advantageous to form the support column 26c and the second panel 3z unitarily. In addition, it is advantageous to provide the support column 26C as close to the center of the second panel 3z as possible to restrain vibration. It is advantageous to provide the support column 26C on the flat plate portion of the second panel 3z to restrain vibration. Further, more than one support column may be provided.

In the example of FIG. 25, the packing 27A is mounted to the tip end of the support column 26A. However, the packing 27A need not be mounted, and the tip end of the support column 26A may be in contact with the third panel 4z while directly pressing against the third panel 4z. In the example of FIG. 26 also, the packing 27B need not be mounted to the tip end of the support column 26B, and the tip end of the support column 26B may be in direct contact with the carrier module 8. In the example of FIG. 27 also, the packing 27C need not be mounted to the tip end of the support column 26C, and the tip of the support column 26C may be in direct contact with the first panel 2z. Further, when a packing, which covers a gap between the support column 26A and the through-hole 8x, is provided in the configuration shown in FIG. 25, or when a packing, which covers a gap between the support column 26C and the through-hole 8g, is provided in the configuration shown FIG. 27, airtightness is increased, and the sound quality is improved.

Figure 28:
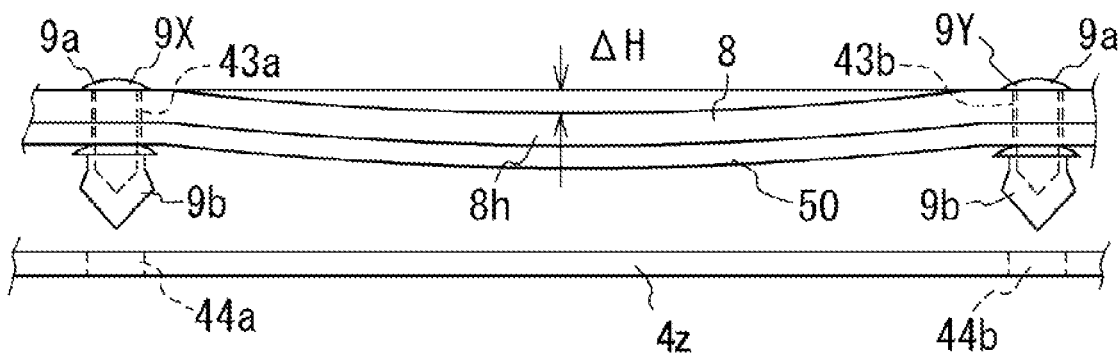
FIG. 28 is a side view showing an example of a coupling structure provided between the carrier module and the third panel (the inner panel) comprising the speaker system in a pre-coupled state.
Figure 29:
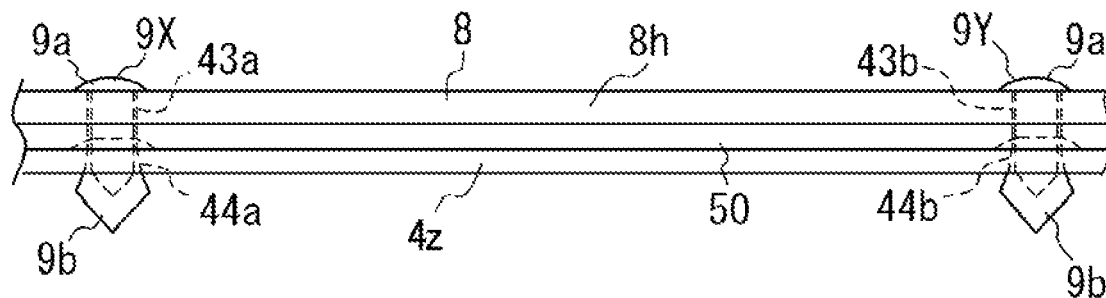
FIG. 29 is a side view showing the coupling structure provided between the carrier module and the third panel in FIG. 28 in a coupled state.

FIGS. 28 and 29 show another configuration example for increasing the airtightness between the carrier module 8 and the third panel 4z. FIG. 28 shows the carrier module 8 and the third panel 4z before coupling, and FIG. 29 shows the carrier module 8 and the third panel 4z after coupling. The carrier module 8 includes an outer edge portion. As shown in FIGS. 28 and 29, a first hole 43a and a second hole 43b are formed in the outer edge portion of the carrier module 8. The first hole 43a is spaced apart from the second hole 43b. A first hole 44a and a second hole 44b are formed in the third panel 4z. The first hole 44a corresponds to the first hole 43a. The second hole 44b corresponds to the second hole 44b.

A coupling member, which couples the carrier module 8 to the third panel 4z, includes the first coupling member 9X and the second coupling member 9Y. The first coupling member 9X is inserted into the first hole 43a. The second coupling member 9Y is inserted into the second hole 43b. Each of the coupling members 9X and 9Y is a known member, and includes the female members 9b and the male members 9a fitted into the female members 9b respectively. For example, when one of the male members 9a is tightened by screwing or loosened by unscrewing, the one of the male members 9a is fixed to or separated from one of the female members 9b.

Each of the male members 9a includes a flange portion. In the first coupling member 9X, as shown in FIG. 28, one of the male members 9a is inserted into the first hole 43a of the carrier module 8 until the flange portion of one of the male members 9a contacts the carrier module 8. The one of the male members 9a is fitted into one of the female holes 9b through the first hole 43a. The one of the female members 9b is fitted into the first hole 44a of the third panel 4z. In the second coupling member 9Y, one of the male members 9a is inserted into the second hole 43b of the carrier module 8 until the flange portion of the one of the male members 9a contacts the carrier module 8. The one of the male members 9a is fitted into the one of the females 9b through the second hole 43b. The one of the female members 9b is fitted into the second hole 44b of the third panel 4z. In this way, the carrier module 8 is fixed to the third panel 4z.

The carrier module 8 has elastic properties. The outer edge portion of the carrier module 8 includes a portion 8h between the first hole 43a and the second hole 43b. As shown in FIG. 28, in a state in which the carrier module 8 is separated from the third panel 4z, the portion 8h is bent by ΔH in a direction toward the third panel 4z. Therefore, as shown in FIG. 29, when the carrier module 8 is coupled to the third panel 4z by the coupling members 9X and 9Y, the portion 8h is pressed against the third panel 4z via the packing 50. Therefore, adhesion and airtightness between the carrier module 8 and the third panel 4z are increased. Consequently, it is possible to inhibit sound from leaking through the gap between the carrier module 8 and the third panel 4z. Thus, it is possible to minimize undesirable variations in sound, and to improve the sound quality.

Each of the coupling members 9X and 9Y may include one of known members having various structures for coupling. The structure, in which the coupling member is used to carry out the coupling, also is not limited to the structure shown in FIGS. 28 and 29.

Figure 30:
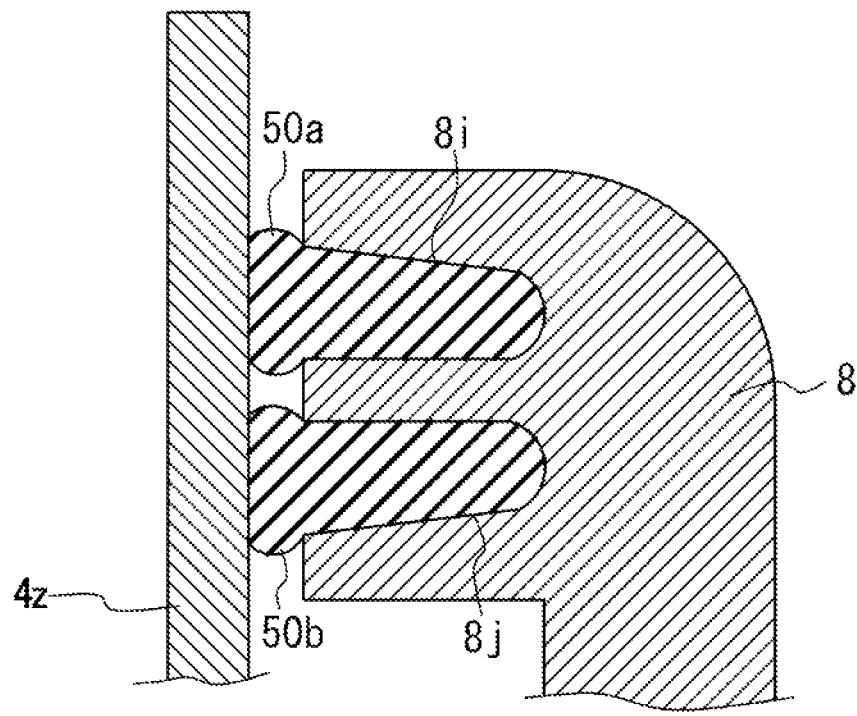
FIG. 30 is a cross-sectional view showing a combined structure of an outer edge of the carrier module and the third panel of the speaker system.

FIG. 30 shows another configuration example for increasing the airtightness between the carrier module 8 and the third panel 4z. In this example, the carrier module 8 includes a groove-shaped first packing mounting portion 8i and a groove-shaped second packing mounting portion 8j. The first packing mounting portion 8i is formed along the outer edge portion of the carrier module 8. The second packing mounting portion 8j is formed along the first packing mounting portion 8i. Further, the configuration example includes packings 50a and 50b formed of rubber or a similar material. The packing 50a is mounted to the carrier module 8. The packing 50a is mounted to the first packing mounting portion 8i. The packing 50a is in contact with the third panel 4z while directly pressing against the third panel 4z. The packing 50b is mounted to the carrier module 8. The packing 50b is mounted to the second packing mounting portion 8j. The packing 50b is in contact with the third panel 4z while pressing against the third panel 4z.

In the configuration shown in FIG. 30, the packing 50a is mounted to the first packing mounting portion 8i, and the packing 50b is mounted to the second packing mounting portion 8j. Thus, the airtightness between the carrier module 8 and the third panel 4z is increased. Therefore, it is possible to inhibit sound from leaking through the outer edge portion of the carrier module 8. Consequently, an effect of maintaining sound pressure across the low sound range is attained.

Figure 31:
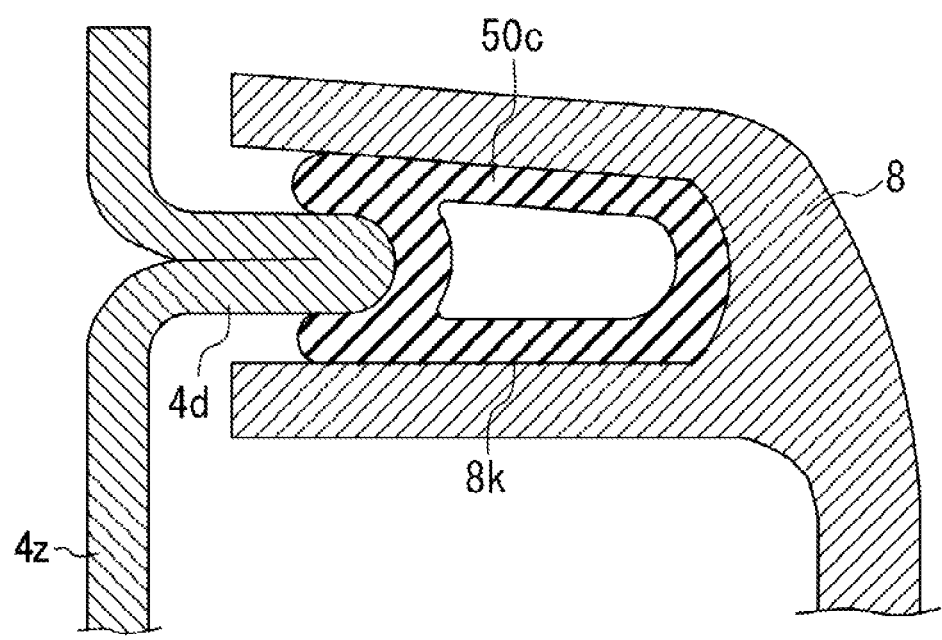
FIG. 31 is a cross-sectional view showing another example of the combined structure of the outer edge of the carrier module and the third panel of the speaker system.

FIG. 31 shows still another configuration example for increasing the airtightness between the carrier module 8 and the third panel 4z. The example configuration includes a groove-shaped packing mounting portion 8k, a packing 50c, and a protuberance 4d. The packing mounting portion 8k is provided along the outer edge portion of the carrier module 8. The packing 50c is formed of rubber or a similar material. The packing 50c is embedded in the packing mounting portion 8k. The protuberance 4d is provided on the third panel 4z. The protuberance 4d is coupled to the packing mounting portion 8k through the packing 50c.

In the configuration of FIG. 31, the protuberance 4d is in contact with the packing 50c while pressing against the packing 50c. Consequently, the protuberance 4d is coupled to the carrier module 8, and adhesion between the outer edge portion of the carrier module 8 and the third panel 4z is increased. Thus, it is possible to inhibit sound from leaking through the outer edge portion of the carrier module 8. Consequently, an effect of maintaining the sound pressure across the low sound range is attained.

The packing mounting portion 8i, 8j or 8k may be formed in a shape that is different from the groove shape, such as a planar shape. The packing 50a, 50b or 50c may be fixed to the packing mounting portion by welding, bonding, use of a fixture or the like.

Figure 32:
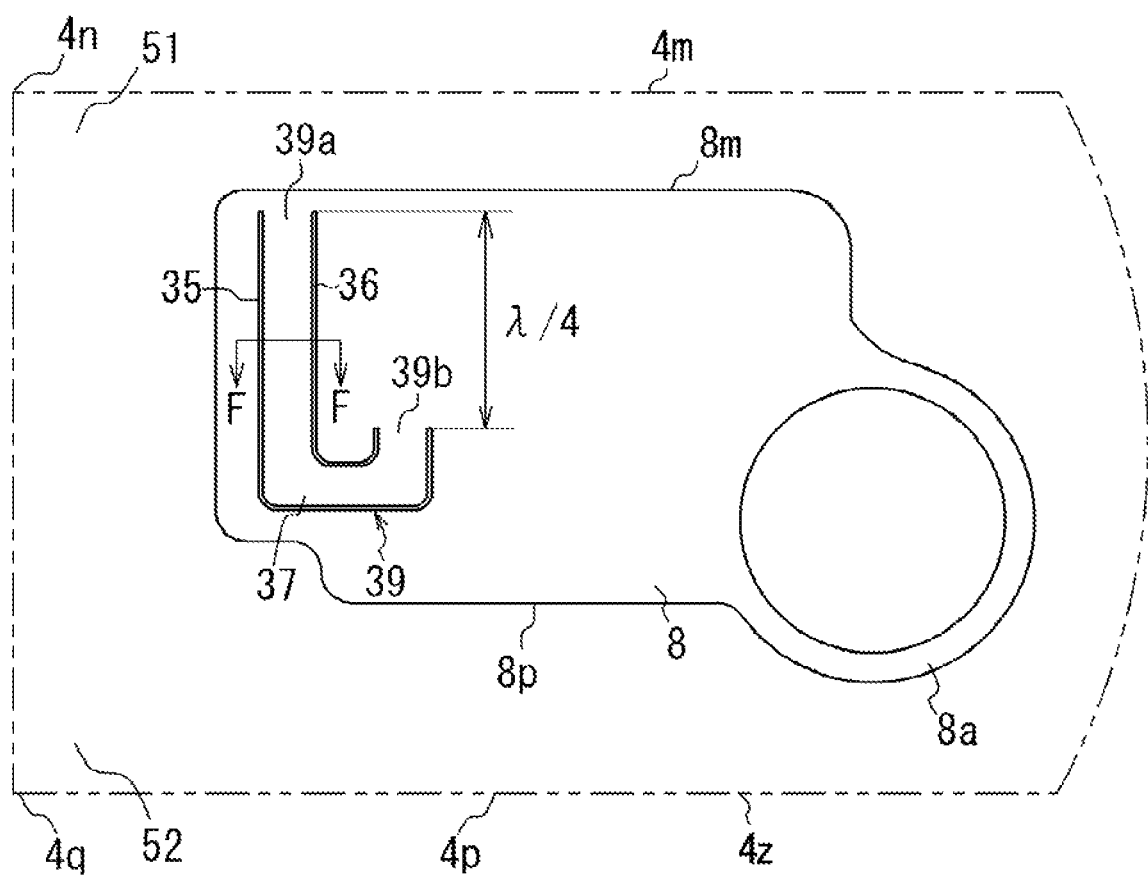
FIG. 32 is a view of a wall portion for forming a J-shaped tube provided in the carrier module of the speaker system as viewed from the exterior of the compartment.
Figure 33:
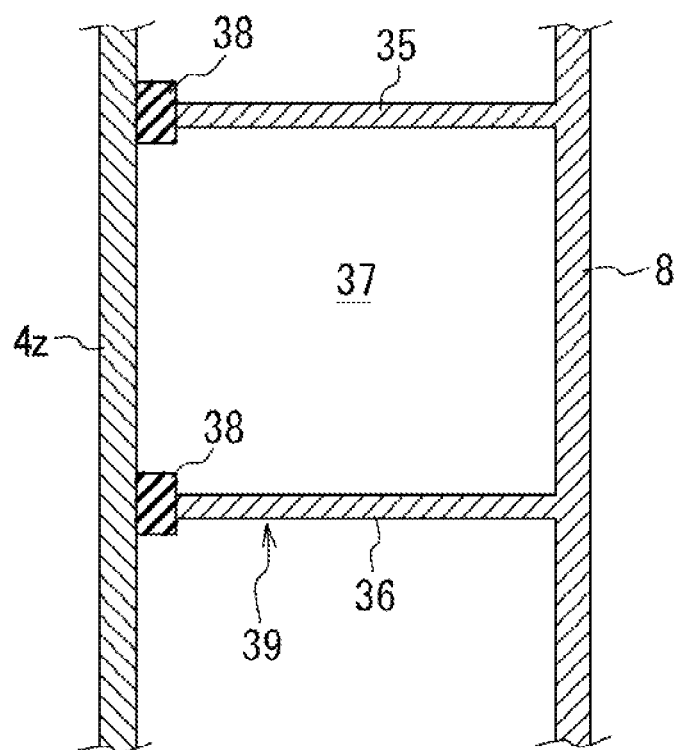
FIG. 33 is a cross-sectional view corresponding to F1-F1 of FIG. 32, and showing a part of the J-shaped tube formed between the carrier module and the first panel of the speaker system.

FIGS. 32 and 33 show an example configuration for reducing occurrence of standing waves in a space surrounded by the first panel 2z, the third panel 4z, and the carrier module 8. The carrier module 8 includes a facing surface that faces the first panel 2z. As shown in FIGS. 32 and 33, the wall portions 35 and 36 are formed on the facing surface of the carrier module 8. Each of the wall portions 35 and 36 extends toward the third panel 4z. A groove 37 is formed between the wall portions 35 and 36. The configuration shown in FIGS. 32 and 33 includes packings 38. The wall portion 35 includes a tip end that faces the first panel 2z. One of the packings 38 is mounted to the tip end of the wall portions 35. The wall portion 36 includes a tip end that faces the first panel 2z. The other of the packings 38 is mounted to the tip end of the wall portion 36. Each of the packings 38 is formed of rubber or the like. The packings 38 are in contact with the first panel 2z. Thus, the airtightness between the wall portion 35 and the first panel 2z can be increased, and the airtightness between the wall portion 35 and the first panel 2z can be increased. As described above, a tube portion 39 is formed between the carrier module 8 and the first panel 2z by the wall portions 35 and 36. The tube portion 39 reduces the standing waves that occur in the internal space surrounded by the first panel 2z, the carrier module 8 and the third panel 4z.

When sound waves, which have the same frequency as the natural frequency of the enclosure, are output from the speaker 5 into the internal space (into the enclosure), each of the sound waves reciprocates between the walls of the enclosure. Combination of the reciprocating standing waves generates the standing waves SWk (k=1, 2, . . . ), dependent on the shape of the internal space defined by the first panel 2z, the carrier module 8, and the second panel 3z. The tube portion 39 reduces an occurrence of the standing waves SWk. The tube portion 39 has a tube length that is approximately half that of a wavelength of a primary standing wave SW1. The primary standing wave SW1 is lowest in order among the standing waves SWk to be suppressed. The tube portion 39 has a first opening end 39a and a second opening end 39b. The tube portion 39 is bent by 90 degrees at two points between the first opening end 39a and the second opening end 39b. The tube portion 39 is accommodated in the internal space in a shape that satisfies each of a first and second condition.

The first condition is one in which the first opening end 39a is disposed at a first place and the second opening end 39b is disposed at a second place. The first place is a position approximately where an antinode occurs in the standing wave of the lowest order among the standing waves SWk. The second place is a position approximately where a sound pressure node occurs. The carrier module 8 has an upper end portion 8m and a lower end portion 8p. The internal space is surrounded by surfaces that include an upper wall surface and a lower wall surface. The upper wall surface faces the lower wall surface. The upper wall surface is positioned at a side of the upper end portion 8m. The lower wall surface is positioned at a side of the lower end portion 8p. The second condition is a condition in which the first opening end 39a and the second opening end 39b are respectively disposed at positions that are separated from each other by approximately a quarter of a wavelength of the standing wave SWk in a direction from the upper wall surface toward the lower wall surface.

In this example, the tube portion 39 has a J shape. The third panel 4z includes an upper end portion 4m and a lower end portion 4p. The third panel 4z includes an upper corner portion 4n that is positioned on the side of the upper end portion 4m. The third panel 4z includes a lower corner portion 4q that is positioned on the side of the lower end portion 4p. The internal space is surrounded by the first panel 2z, the carrier module 8 and the second panel 3z. The internal space includes corner portions 51 and 52. The corner portion 51 is located on the upper end portion 8m side. The corner portion 52 is located on the lower end portion 8p side. The first opening end 39a of the J-shaped tube portion 39 is positioned near the corner portion 51. That is, the first opening end 39a is positioned near the upper corner portion 4n. Each of the corner portions 51 and 52 is at a position in which the sound pressure is high (the antinode portions of the standing wave). The second opening end 39b is positioned at a middle portion of the internal space in the vertical direction, that is, at a position in which the sound pressure is low (the node portion of the standing wave). The distance between the open ends 39a and 39b is set to one quarter ($\lambda/4$) of the wavelength $\lambda$, of the fundamental wave of the standing wave.

As shown in FIGS. 32 and 33, in a construction in which the J-shaped tube portion 39 is formed between the first panel 2z and the carrier module 8, occurrence of standing waves in the internal space surrounded by the first panel 2z, the carrier module 8, and the second panel 3z, is restrained, and the sound quality is improved. The wall portions 35 and 36 may be provided on the first panel 2z. Further, the direction of the J-shaped tube portion 39 need not be the vertical direction.

The above-described example shows only a typical form of this disclosure. The present disclosure is not limited to the above-described example, and various modifications and additions can be made as long as they do not depart from the spirit of the present disclosure. In the above-described embodiment, the through-holes 4a and 4b formed in the third panel 4z are covered by the carrier module 8 or the speaker 5. Thus, the second panel 3z does not serve as the enclosure for the speaker 5. Therefore, the packing 10 between the second panel 3z and the third panel 4z may be omitted. When additional through-holes are formed in the third panel 4z and the additional through holes are not covered by the carrier module 8, the packing 10 may be formed between the second panel 3z and the third panel 4z, as well as in the above-described embodiment, in order to increase the airtightness.

For example, the following configuration is inferred from the above-exemplified form.

The speaker system according to an aspect (a first aspect) of the present disclosure includes an outer panel that constitutes a first part of a vehicle door of a vehicle having a compartment; a panel member that constitutes a second part of the vehicle door, the panel member being situated closer to the compartment than the outer panel; an inner panel that constitutes a third part of the vehicle door, the inner panel residing between the outer panel and the panel member to form a first space and a second space, the first space constituting a space defined between the panel member and the inner panel, and the second space constituting a space defined between the outer panel and the inner panel, wherein the inner panel has a through-hole configured to communicate the first space with the second space; and a speaker mounted to the panel member; wherein: the panel member is mounted to the inner panel; and the panel member together with at least the outer panel constitutes a speaker enclosure.

According to the above-described aspect, the speaker enclosure is formed by at least the outer panel and the panel member situated closer to the compartment than the inner panel. Consequently, the area volume of the enclosure (the cabinet) for the speaker system can be increased. Therefore, the lowest resonance frequency can be decreased, and the sound pressure across the low sound range can be increased. Further, in this aspect, the panel member, to which the speaker is mounted in advance, is mounted to the inner panel. Therefore, the speaker can be easily mounted to a seat door.

In an example (a second aspect) of the first aspect, the panel member includes a first portion and a second portion. The speaker is mounted to the first portion. The first portion is thicker than the second portion. In this case, since the rigidity of the first portion of the panel member is increased, transmission of the vibration from the speaker to the panel member can be restrained. As a result, enclosure noise can be restrained, and the sound quality can be improved.

In an example (a third aspect) of the second aspect, the panel member further includes a rib that is formed to be integral with the first portion. In this case, the rigidity of the panel member is further increased. Therefore, restraint of the vibration of the panel member is further increased, and the sound quality is further improved.

In an example (a fourth aspect) of any one of the first to third aspects, the panel member includes a core having a honeycomb structure or a foam structure. In this case, it is possible to obtain a panel member having a light weight and high rigidity, and thus the transmission loss in the low sound range is further increased. As a result, it is possible to inhibit sound that passes through the second panel after being output from a back surface of the speaker. Consequently, the sound quality can be improved. The rigidity of the panel member can be further increased by providing ribs on the surface of the panel member on the compartment side or on the surface on the opposing side or on both surfaces, in addition to the configuration that includes the core material having the honeycomb structure or the foam structure, as a result of which sound quality can be further improved.

In an example (a fifth aspect) of any one of the first to fourth aspects, the panel member includes an outer edge portion having a first hole and a second hole, and the speaker system further includes a first coupling member configured to pass through the first hole, the first coupling member being configured to couple the panel member with the inner panel, and a second coupling member configured to pass through the second hole, the second coupling member being configured to couple the panel member with the inner panel. The outer edge portion includes a fourth part between the first hole and the second hole; and the fourth part is bent toward the inner panel in a state in which the panel member is separated from the inner panel. In this case, in a state in which the panel member is mounted to the inner panel, the portion of the panel member between the first hole and the second hole is pressed against the inner panel, and thus the airtightness is improved. Therefore, since the leakage of sound from the gap between the panel member and the inner panel is restrained, the panel member can effectively serve as the enclosure, thus the sound quality can be improved, and undesirable variations in the sound quality can be minimized.

In an example (a sixth aspect) of any one of the first to fifth aspects, the example may further include a first packing, and a second packing. The panel member includes an outer edge portion having a first portion and a second portion that is provided side by side with the first portion, the first packing is mounted to the first portion, and the first packing is configured to be in contact with the inner panel while pressing the inner panel; and the second packing is mounted to the second portion, and the second packing is configured to be in contact with the inner panel while pressing against the inner panel. In this case, the packing is mounted to each of the first portion and the second portion. Therefore, the airtightness is increased and the leakage of sound from a gap between the panel member and the inner panel is restrained. Thus, the panel member can effectively serve as the enclosure for the speaker. Consequently, the sound quality can be improved, and variations in the sound quality can be eliminated.

In an example (a seventh aspect) of any one of the first to fifth aspects, the example may further include a packing. The panel member includes an outer edge portion having a fifth part where the packing is mounted. The speaker system further includes a protuberance provided on the inner panel, the protuberance being configured to be coupled to the fifth part via the packing. In this case, since the protuberance provided on the inner panel is coupled with the packing, the airtightness is increased. Therefore, the leakage of sound from the gap between the panel member and the inner panel is inhibited. Accordingly, the panel member can effectively serve as the enclosure for the speaker, the sound quality can be improved, and undesirable variations in the sound quality can be minimized.

In an example (an eighth aspect) of any one of the first to seventh aspects, the panel member may be a door trim. In this case, the enclosure having a door trim as a component can be realized.

In an example (a ninth aspect) of the eighth aspect, the example may include a support column, together with the door trim or the inner panel, formed as a single piece to be integral, and the support column configured to support the door trim and the inner panel. In this case, since vibration of the door trim, which trim faces the compartment, is restrained by the support column, enclosure noise can be restrained, and sound quality can be improved.

In an example (a tenth aspect) of the eighth aspect, the example may include a support column, together with the outer panel or the door trim, formed as a single piece, the support column being configured to pass through the through-hole, and to support the outer panel and the door trim. In this case, since the vibration of the door trim, which trim faces the vehicle compartment, is restrained by the support column, enclosure noise can be inhibited and the sound quality can be improved.

In an example (an eleventh aspect) of the eighth to tenth aspects, one of the door trim and the inner panel includes a wall portion, and the wall portion and the other of the door trim and the inner panel together constitute a tube portion configured to reduce occurrence of standing waves generated in an internal space surrounded by the outer panel and the door trim. Thus, occurrence of the standing waves in the enclosure constituted by the outer panel and the panel member is reduced, and the sound quality is improved.

In an example (a twelfth aspect) of the eighth to eleventh aspects, the example may include a film that is formed from a synthetic resin and is configured to cover the through-hole. The synthetic resin film has a sufficiently low transmission loss in a low sound range. Thus, even when the film covers the through-hole, a space surrounded by the outer panel and the door trim acts as an integral space (a space within the enclosure) particularly in the low sound range.

In an example (a thirteenth aspect) of the first to seventh aspects, the panel member may be a carrier module. In this case, an enclosure having the carrier module as a component can be realized.

In an example (a fourteenth aspect) of the thirteenth aspect, the example may include a door trim that constitutes the vehicle door, and a support column, together with the door trim or the inner panel, formed unitarily. The carrier module is arranged between the door trim and the inner panel, and the support column resides between the door trim and the inner panel to support the door trim and the inner panel. In this case, the vibration of the door trim, which faces the compartment, is restrained by the support column. As a result, enclosure noise is restrained, and the sound quality can be improved.

In an example (a fifteenth aspect) of the thirteenth aspect, the example may include a door trim that constitutes a part of the vehicle door, and a support column, together with the door trim or with the carrier module, formed as one piece. The carrier module is arranged between the door trim and the inner panel, and the support column resides between the door trim and the carrier module to support the door trim and the carrier module. In this case, the vibration of the door trim, which trim faces the compartment, is restrained by the support column. As a result, the enclosure noise can be restrained, and sound quality can be improved.

In an example (a sixteenth aspect) of the thirteenth to fifteenth aspects, the outer panel or the carrier module includes a wall portion. The example further includes: a tube portion configured to reduce occurrence of standing waves generated in an internal space surrounded by the outer panel and the carrier module, the tube portion being formed by the wall portion and the carrier module or by the wall portion and the outer panel. In this case, the occurrence of the standing waves in the enclosure constituted by the outer panel, the carrier module, and the inner panel is reduced, and the sound quality is improved.

Further, a vehicle door of a vehicle having a compartment according to an aspect of the present disclosure includes an outer panel; a panel member situated closer to the compartment than the outer panel; an inner panel residing between the outer panel and the panel member to form a first space and a second space, the first space constituting a space defined between the panel member and the inner panel, and the second space constituting a space defined between the outer panel and the inner panel, wherein the inner panel has a through hole configured to communicate the first space with the second space; and a speaker mounted to the panel member, wherein the panel member is mounted to the inner panel, and the panel member together with at least the outer panel constitutes a speaker enclosure.

According to this aspect, since the enclosure for the speaker is formed by at least the outer panel and the panel member situated closer to the compartment than the inner panel, the area volume of the enclosure (cabinet) for the speaker system can be increased. Thus, the lowest resonance frequency can be decreased, and the reproduction sound pressure across the low sound range can be increased.

DESCRIPTION OF REFERENCE SIGNS

1, 1X, 1Y: Vehicle door, 2, 2z: First panel, 3, 3A, 3B, 3z: Second panel, 3a, 3i, 3j, 3k, 3z: Packing mounting portion, 3c: Hole, 3d: Mounting portion of speaker, 3f: Rib, 4, 4z: Third panel, 4a, 4b: Through-hole, 5: Speaker, 9: Connection member, 9X: First coupling member, 9Y: Second coupling member, 10, 10a to 10c: Packing, 11, 11a, 12: Space, 14: Mounting member, 15, 16: Screw, 20: Core material having honeycomb structure, 21: Adhesive, 22: Surface material, 23: Back surface material, 24: Core material having foam structure, 26, 26A, 26B, 26C, 28: Support column, 27, 27A, 27B, 27C, 29: Packing, 30, 32: First hole, 31, 33: Second hole, 35, 36: Wall portion, 39: J-shaped tube portion, 40: Sound insulation tubular body, 43a, 44a: First hole, 43b, 44b: Second hole.

What is claimed is:

1. A speaker system, comprising:
an outer panel that constitutes a first part of a vehicle door of a vehicle having a compartment a panel member that constitutes a second part of the vehicle door, the panel member being situated closer to the compartment than the outer panel;
an inner panel that constitutes a third part of the vehicle door, the inner panel residing between the outer panel and the panel member to form a first space and a second space, the first space constituting a space defined between the panel member and the inner panel, and the second space constituting a space defined between the outer panel and the inner panel, wherein the inner panel has a through hole configured to communicate the first space with the second space; and
a speaker mounted to the panel member;
wherein:
the panel member is mounted to the inner panel; and
the panel member together with at least the outer panel constitutes a speaker enclosure;
wherein the panel member includes an outer edge portion having a first hole and a second hole, and
the speaker system further comprising;
a first coupling member configured to pass through the first hole, the first coupling member being configured to couple the panel member with the inner panel, and
a second coupling member configured to pass through the second hole, the second coupling member being configured to couple the panel member with the inner panel,
wherein:
the outer edge portion includes a fourth part between the first hole and the second hole, the fourth part being bent toward the inner panel in a state in which the panel member is separated from the inner panel.

2. A speaker system, comprising:
an outer panel that constitutes a first part of a vehicle door of a vehicle having a compartment;
a panel member that constitutes a second part of the vehicle door, the panel member being situated closer to the compartment than the outer panel;
an inner panel that constitutes a third part of the vehicle door, the inner panel residing between the outer panel and the panel member to form a first space and a second space, the first space constituting a space defined between the panel member and the inner panel, and the second space constituting a space defined between the outer panel and the inner panel, wherein the inner panel has a through hole configured to communicate the first space with the second space; and
a speaker mounted to the panel member;
wherein:
the panel member is mounted to the inner panel; and
the panel member together with at least the outer panel constitutes a speaker enclosure;
further comprising:
a first packing, and
a second packing,
wherein:
the panel member includes an outer edge portion having a first portion and a second portion that is provided side by side with the first portion,
the first packing is mounted to the first portion, and the first packing is configured to be in contact with the inner panel while pressing the inner panel; and
the second packing is mounted to the second portion, and the second packing is configured to be in contact with the inner panel while pressing against the inner panel.

3. A speaker system, comprising:
an outer panel that constitutes a first part of a vehicle door of a vehicle having a compartment;
a panel member that constitutes a second part of the vehicle door, the panel member being situated closer to the compartment than the outer panel;
an inner panel that constitutes a third part of the vehicle door, the inner panel residing between the outer panel and the panel member to form a first space and a second space, the first space constituting a space defined between the panel member and the inner panel, and the second space constituting a space defined between the outer panel and the inner panel, wherein the inner panel has a through hole configured to communicate the first space with the second space; and
a speaker mounted to the panel member;
wherein:
the panel member is mounted to the inner panel; and
the panel member together with at least the outer panel constitutes a speaker enclosure;
further comprising a packing,
wherein the panel member includes an outer edge portion having a fifth fourth part where the packing is mounted,
the speaker system further comprising
a protuberance provided on the inner panel, the protuberance being configured to be coupled to the fourth part via the packing.

4. A speaker system, comprising:
an outer panel that constitutes a first part of a vehicle door of a vehicle having a compartment;
a panel member that constitutes a second part of the vehicle door, the panel member being situated closer to the compartment than the outer panel;
an inner panel that constitutes a third part of the vehicle door, the inner panel residing between the outer panel and the panel member to form a first space and a second space, the first space constituting a space defined between the panel member and the inner panel, and the second space constituting a space defined between the outer panel and the inner panel, wherein the inner panel has a through hole configured to communicate the first space with the second space; and
a speaker mounted to the panel member;
wherein:
the panel member is mounted to the inner panel; and
the panel member together with at least the outer panel constitutes a speaker enclosure;
wherein the panel member is a door trim;
further comprising a support column, together with the outer panel or the door trim, formed as one piece, the support column residing between the outer panel and the door trim, being configured to pass through the through hole, and being configured to support the outer panel and the door trim.

5. A speaker system, comprising:
an outer panel that constitutes a first part of a vehicle door of a vehicle having a compartment;
a panel member that constitutes a second part of the vehicle door, the panel member being situated closer to the compartment than the outer panel;
an inner panel that constitutes a third part of the vehicle door, the inner panel residing between the outer panel and the panel member to form a first space and a second space, the first space constituting a space defined between the panel member and the inner panel, and the second space constituting a space defined between the outer panel and the inner panel, wherein the inner panel has a through hole configured to communicate the first space with the second space; and
a speaker mounted to the panel member;
wherein:
the panel member is mounted to the inner panel; and
the panel member together with at least the outer panel constitutes a speaker enclosure;
wherein the panel member is a door trim;
wherein:
one of the door trim and the inner panel includes a wall portion, and
the wall portion and the other of the door trim and the inner panel together constitute a tube portion configured to reduce occurrence of standing waves generated in an internal space surrounded by the outer panel and the door trim.

6. A speaker system, comprising:
an outer panel that constitutes a first part of a vehicle door of a vehicle having a compartment;
a panel member that constitutes a second part of the vehicle door, the panel member being situated closer to the compartment than the outer panel;
an inner panel that constitutes a third part of the vehicle door, the inner panel residing between the outer panel and the panel member to form a first space and a second space, the first space constituting a space defined between the panel member and the inner panel, and the second space constituting a space defined between the outer panel and the inner panel, wherein the inner panel has a through hole configured to communicate the first space with the second space; and
a speaker mounted to the panel member;
wherein:
the panel member is mounted to the inner panel; and
the panel member together with at least the outer panel constitutes a speaker enclosure;
wherein the panel member is a door trim;
further comprising a film that is formed from a synthetic resin and is configured to cover the through hole.

7. A speaker system, comprising:
an outer panel that constitutes a first part of a vehicle door of a vehicle having a compartment;
a panel member that constitutes a second part of the vehicle door, the panel member being situated closer to the compartment than the outer panel;
an inner panel that constitutes a third part of the vehicle door, the inner panel residing between the outer panel and the panel member to form a first space and a second space, the first space constituting a space defined between the panel member and the inner panel, and the second space constituting a space defined between the outer panel and the inner panel, wherein the inner panel has a through hole configured to communicate the first space with the second space; and
a speaker mounted to the panel member;
wherein:
the panel member is mounted to the inner panel; and
the panel member together with at least the outer panel constitutes a speaker enclosure;
wherein the panel member is a carrier module;
further comprising:
a door trim that constitutes the vehicle door, and
a support column, together with the door trim or the inner panel, formed unitarily,
wherein:
the carrier module is arranged between the door trim and the inner panel, and the support column resides between the door trim and the inner panel to support the door trim and the inner panel.

8. A speaker system, comprising:
an outer panel that constitutes a first part of a vehicle door of a vehicle having a compartment;
a panel member that constitutes a second part of the vehicle door, the panel member being situated closer to the compartment than the outer panel;
an inner panel that constitutes a third part of the vehicle door, the inner panel residing between the outer panel and the panel member to form a first space and a second space, the first space constituting a space defined between the panel member and the inner panel, and the second space constituting a space defined between the outer panel and the inner panel, wherein the inner panel has a through hole configured to communicate the first space with the second space; and
a speaker mounted to the panel member;
wherein:
the panel member is mounted to the inner panel; and
the panel member together with at least the outer panel constitutes a speaker enclosure;
wherein the panel member is a carrier module;
further comprising:
a door trim that constitutes a part of the vehicle door, and
a support column, together with the door trim or with the carrier module, formed as one piece,
wherein:
the carrier module is arranged between the door trim and the inner panel, and
the support column resides between the door trim and the carrier module to support the door trim and the carrier module.

9. A speaker system, comprising:
an outer panel that constitutes a first part of a vehicle door of a vehicle having a compartment;
a panel member that constitutes a second part of the vehicle door, the panel member being situated closer to the compartment than the outer panel;
an inner panel that constitutes a third part of the vehicle door, the inner panel residing between the outer panel and the panel member to form a first space and a second space, the first space constituting a space defined between the panel member and the inner panel, and the second space constituting a space defined between the outer panel and the inner panel, wherein the inner panel has a through hole configured to communicate the first space with the second space; and
a speaker mounted to the panel member;
wherein:
the panel member is mounted to the inner panel; and
the panel member together with at least the outer panel constitutes a speaker enclosure;
wherein the panel member is a carrier module;
wherein:
the outer panel or the carrier module includes a wall portion, and
the speaker system further comprising:
a tube portion configured to reduce occurrence of standing waves generated in an internal space surrounded by the outer panel and the carrier module, the tube portion being formed by the wall portion and the carrier module or by the wall portion and the outer panel.

\* \* \* \* \*